United States Patent [19]

Shustack

[11] Patent Number: 5,146,531
[45] Date of Patent: Sep. 8, 1992

[54] ULTRAVIOLET RADIATION-CURABLE COATINGS FOR OPTICAL FIBERS AND OPTICAL FIBERS COATED THEREWITH

[75] Inventor: Paul J. Shustack, West Chester, Ohio

[73] Assignee: Borden, Inc., Columbus, Ohio

[21] Appl. No.: 742,531

[22] Filed: Aug. 8, 1991

Related U.S. Application Data

[63] Continuation of Ser. No. 350,239, May 11, 1989, abandoned.

[51] Int. Cl.⁵ .............................................. G02B 6/16
[52] U.S. Cl. ..................................... 385/128; 385/145
[58] Field of Search ............... 350/96.23, 96.29, 96.30, 350/96.31, 96.32, 96.33, 96.34; 385/123–128, 141, 144, 145

[56] References Cited

U.S. PATENT DOCUMENTS

| | | |
|---|---|---|
| 3,364,059 | 6/1966 | Marzocchi et al. ............... 428/391 |
| 3,655,625 | 4/1972 | Thomas ..................... 260/77.5 AM |
| 3,855,379 | 12/1974 | Araki et al. ................. 260/77.5 CR |
| 3,862,882 | 9/1972 | Marzocchi ........................ 428/378 |
| 3,912,516 | 10/1975 | Recchia et al. ........................ 96/85 |
| 3,949,141 | 5/1974 | Marzocchi et al. .............. 428/378 |
| 3,980,390 | 9/1976 | Yamamoto et al. ............ 350/96.33 |
| 4,001,015 | 1/1977 | Barzynski et al. ...................... 96/33 |
| 4,004,997 | 1/1977 | Tsukamoto et al. ............. 204/159.14 |
| 4,023,973 | 5/1977 | Imaizumi et al. ................ 96/115 R |
| 4,082,634 | 4/1978 | Chang ........................... 204/159.15 |
| 4,088,498 | 5/1978 | Faust ................................. 96/115 P |
| 4,105,284 | 8/1978 | Olshansky ...................... 350/96.33 |
| 4,120,721 | 10/1978 | Ketley et al. ........................ 96/36.3 |
| 4,125,644 | 11/1978 | Ketley et al. ......................... 427/36 |
| 4,131,602 | 12/1978 | Hoddakowski et al. ............. 528/49 |
| 4,133,723 | 1/1979 | Howard ............................... 204/15 |
| 4,137,081 | 1/1979 | Pohl ................................... 96/87 R |
| 4,174,307 | 11/1979 | Rowe ............................ 204/159.19 |
| 4,188,455 | 2/1980 | Howard .......................... 428/423.1 |
| 4,192,684 | 3/1980 | Gensho et al. .................... 430/284 |
| 4,207,373 | 4/1980 | Segal .................................. 428/251 |
| 4,210,713 | 7/1980 | Sumiyoshi et al. ................ 430/284 |
| 4,214,965 | 7/1980 | Rowe ............................. 204/159.15 |
| 4,234,399 | 11/1980 | McDowell et al. ............ 204/159.15 |
| 4,243,793 | 1/1981 | Williams ............................. 528/75 |
| 4,281,095 | 3/1981 | Chase et al. ........................ 428/391 |
| 4,295,909 | 10/1981 | Baccei .............................. 156/307.3 |
| 4,304,923 | 12/1981 | Rousseau ............................ 560/26 |
| 4,324,575 | 4/1982 | Levy .................................. 65/3.11 |
| 4,344,982 | 8/1982 | Chen .................................... 427/44 |
| 4,353,980 | 10/1982 | Helling et al. ..................... 430/532 |
| 4,377,458 | 3/1983 | Watanabe ...................... 204/159.16 |
| 4,377,679 | 3/1983 | Schmidle ............................. 528/75 |
| 4,416,750 | 11/1983 | Murphy et al. ................ 204/159.19 |
| 4,439,600 | 3/1984 | Moran, Jr. ........................... 528/392 |
| 4,451,523 | 5/1984 | Nativi et al. ...................... 428/209 |
| 4,455,401 | 6/1984 | Son et al. ........................... 524/91 |
| 4,472,019 | 9/1984 | Bishop et al. .................... 350/96.30 |
| 4,472,021 | 9/1984 | Ansel et al. ...................... 350/96.23 |
| 4,474,830 | 10/1984 | Taylor .............................. 427/54.1 |
| 4,474,855 | 10/1984 | Brixius et al. .................... 428/425.8 |
| 4,477,548 | 10/1984 | Harasta et al. ...................... 430/14 |
| 4,481,093 | 11/1984 | Murphy et al. ................ 204/159.19 |
| 4,492,428 | 1/1985 | Levy ................................. 350/96.30 |
| 4,496,210 | 1/1985 | Ansel et al. ...................... 350/96.30 |
| 4,496,686 | 1/1985 | Amsel ................................. 524/850 |
| 4,499,163 | 2/1985 | Ishimaru et al. ........................ 430/5 |
| 4,512,340 | 4/1985 | Buck ................................... 128/90 |
| 4,514,037 | 4/1985 | Bishop et al. .................... 350/96.23 |
| 4,522,465 | 6/1985 | Bishop et al. .................... 350/96.30 |
| 4,525,258 | 6/1985 | Watanabe et al. ............. 204/159.23 |
| 4,533,445 | 8/1985 | Orio .............................. 204/159.19 |
| 4,547,478 | 10/1985 | Chang ................................. 502/154 |
| 4,572,610 | 2/1986 | Krajewski ........................ 350/96.34 |
| 4,587,201 | 5/1986 | Morikawa et al. ................. 430/284 |
| 4,599,274 | 7/1986 | Ando et al. ........................ 428/442 |
| 4,600,627 | 4/1985 | Honda et al. ...................... 428/203 |
| 4,600,649 | 7/1986 | Leo ................................... 428/412 |
| 4,603,064 | 7/1986 | Kania .............................. 427/407.1 |
| 4,608,400 | 8/1986 | Yokoshima et al. ................. 522/96 |
| 4,608,409 | 8/1986 | Coady et al. ....................... 524/199 |
| 4,609,718 | 9/1986 | Bishop et al. ........................ 528/49 |

(List continued on next page.)

Primary Examiner—John D. Lee
Attorney, Agent, or Firm—Venable, Baetjer, Howard & Civiletti

[57] ABSTRACT

Ultraviolet radiation-curable primary and secondary coating compositions for optical fibers are disclosed. The primary coatings comprise a hydrocarbon polyol-based acrylated or methacrylated aliphatic urethane oligomer; an alkyl acrylate or methacrylate monomer; a refractive index modifying monomer or oligomer; a silane adhesion promoter; and a photoinitiator. The secondary coatings comprise a polyester-based aliphatic urethane acrylate or methacrylate oligomer; an acrylated or methacrylated compound; and a photoinitiator. Also disclosed are optical fibers coated with the secondary coating alone or with the primary and secondary coatings of the invention.

FOREIGN PATENT DOCUMENTS

| | | |
|---|---|---|
| 1236623 | 5/1988 | Canada . |
| 0111280 | 12/1983 | European Pat. Off. . |
| 0104057 | 3/1984 | European Pat. Off. . |
| 0149741 | 7/1985 | European Pat. Off. . |
| 0153520 | 9/1985 | European Pat. Off. . |
| 0209641 | 1/1987 | European Pat. Off. . |
| 60-118759 | 6/1985 | Japan . |
| 62-91519 | 4/1987 | Japan . |

OTHER PUBLICATIONS

Swanson et al., "Silane Coupling Agents in Urethane Adhesives", Adhesives Age, Mar. 1972, pp. 26–32.
Swanson et al., "Chemistry of Urethane Adhesives with Silane Coupling Agents", Adhesives Age, Jun. 1973, pp. 23–28.
Plueddemann, E. P., "Silane Adhesion Promoters for Polymeric Coatings", from: Mittal, K. L., Adhesion Aspects of Polymeric Coatings, May 10–15, 1981 Symposium, pp. 363–376.
Randell, D. R., Ed, "Radiation Curing of Polymers: The Proceedings of a Symposium Organized by the North West Region of the Industrial Division of the

86 Claims, No Drawings

| | | | |
|---|---|---|---|
| 4,629,287 | 12/1986 | Bishop | 350/96.34 |
| 4,657,354 | 4/1987 | Kobayshi | 350/432 |
| 4,659,788 | 4/1987 | Ohta et al. | 525/518 |
| 4,660,927 | 4/1987 | Kondow et al. | 350/96.34 |
| 4,672,001 | 6/1987 | Bravet et al. | 428/425.6 |
| 4,682,851 | 7/1987 | Ansel | 350/96.34 |
| 4,690,502 | 9/1987 | Zimmerman et al. | 350/96.29 |
| 4,690,503 | 9/1987 | Janssen et al. | 350/96.30 |
| 4,707,076 | 11/1987 | Skutnik et al. | 350/96.34 |
| 4,717,739 | 1/1988 | Chevreux et al. | 522/79 |
| 4,733,941 | 3/1988 | Broer et al. | 350/96.33 |
| 4,734,333 | 3/1988 | Leo et al. | 428/423.1 |
| 4,741,597 | 5/1988 | Broer | 350/96.34 |
| 4,758,447 | 7/1988 | Broer et al. | 427/44 |
| 4,761,363 | 8/1988 | Hung et al. | 430/284 |
| 4,780,486 | 10/1988 | Lee et al. | 522/14 |
| 4,783,544 | 11/1988 | Yokoshima et al. | 558/267 |
| 4,786,586 | 11/1988 | Lee et al. | 430/532 |
| 4,789,625 | 12/1988 | Ellerstein et al. | 430/372 |
| 4,792,852 | 12/1988 | Narusawa | 358/153 |
| 4,801,186 | 1/1989 | Wagatsuma et al. | 350/96.30 |
| 4,806,574 | 2/1989 | Krajewski et al. | 522/96 |
| 4,849,462 | 7/1989 | Bishop | 522/97 |
| 4,962,992 | 10/1990 | Chapin et al. | 350/96.23 |

OTHER PUBLICATIONS

Royal Society of Chemistry," Special Publication No. 64, University of Lancaster, 18th–19th Sep. 1986, pp. 143–160.

Product Brochure, PCR Prosil Organofunctional Silane Coupling Agents, 7 pages.

Cure Letter, vols. 6 and 7, Jul. 1989, p. 14.

Plueddeman, E. P., "Silane Coupling Agents", Plenum Press, pp. 36–47.

Schonhorn et al., J. of Applied Polymer Science, vol. 23, No. 1, Jan. 1, 1979, pp. 75–84.

Union Carbide Article, Silicones, Organofunctional Silanes—A Profile, pp. 3–9.

Cargill Product Information 15-1512, Radiation Curable Resin.

New Oligomers: Low Polarity Low Permeability Urethane Acrylates with Hydrocarbon Backbones, Ellerstein et al. pp. 6-10/6-18.

ULTRAVIOLET RADIATION-CURABLE COATINGS FOR OPTICAL FIBERS AND OPTICAL FIBERS COATED THEREWITH

BACKGROUND OF THE INVENTION

This application is a continuation of U.S. Ser. No. 350,239 filed May 11, 1989, now abandoned.

COATED OPTICAL FIBERS IN GENERAL

The present invention relates to radiation-curable primary and secondary coatings for optical fibers and to optical fibers containing such coatings.

Until recently, the optical fiber industry was concentrated on so-called "long haul" applications, wherein optical fibers were used to traverse long distances such as in transoceanic or transcontinental cables. In such applications, optical fibers required shielding with voluminous protective cabling material in sheltered subterranean or submarine environments and thus were not directly exposed to environmental hazards.

A recent trend in the optical fiber market is in local area networks for fiber-to-the-home uses. The fibers in such uses are directly exposed to much harsher conditions than previous applications of glass fibers, including severe temperature and humidity extremes. Consequently, previously used coatings do not perform well under such adverse conditions; hence, a need existed for the development of higher performance coatings. Such coatings needed to be able to withstand the above conditions, i.e., to possess thermal, oxidative and hydrolytic stability, and to protect the fiber over the long term, i.e., over twenty-five years' time.

Optical fibers used for light transmission can be prepared which, immediately after drawing, are exceptionally strong and have very few intrinsic defects. However, such pristine fibers are very easily flawed by exposure to environmental conditions including dust and moisture. Even a small flaw can reduce the strength of a fiber by an order of magnitude, rendering it brittle and easily broken by a weak external force. Therefore, optical glass fibers have, in the prior art, been clad with at least one resin coat immediately after their preparation, whose minimum requirement is to protect the underlying pristine fiber from such external forces.

Typically, at least two coatings, a primary, or buffer, coating and a secondary coating, have been used. The inner, or primary, coating is applied directly to the glass fiber and, when cured, forms a soft, rubbery, compliant material which serves as a buffer to cushion and protect the fiber by relieving the stresses created when the fiber is bent, cabled or spooled. Such stress might otherwise induce microbending of the fibers and cause attenuation of the light traveling through them, resulting in inefficient signal transmission. The secondary coating is applied over the primary coating, and must function as a hard, tough protective outer layer preventing damage to the glass fiber during processing and use.

PRIMARY COATING

Certain characteristics are desirable for the primary coating, and others for the secondary coating. For example, the primary coating must maintain adequate adhesion to the glass fiber during thermal and hydrolytic aging, yet be strippable therefrom for splicing purposes. The modulus of the primary coating must be low to cushion and protect the fiber by readily relieving the stresses on the fiber which can induce microbending and consequent inefficient signal transmission. This cushioning effect must be maintained through the temperature range in which the fibers may be exposed throughout their lifetime. Thus, it is necessary for the primary coating to have a low glass transition temperature (Tg). This low glass transition temperature will assure that the coating remains in its rubbery state throughout the possible use temperature range.

However, simply having a low Tg does not ensure good optical loss characteristics at low temperatures. Since the coefficient of thermal expansion of the secondary coating and the glass are appreciably different, when lower temperatures are encountered, the secondary coating contracts more severely than does the glass, thus inducing another form of stress. The primary coating thus should be chosen so that it will relieve this stress. Therefore, it is desirable for the Tg of the primary coating to be lower than the lowest use temperature, yet high enough so that its modulus increases as the temperature is lowered. This characteristic will offset the difference of the coefficients of thermal expansion between the secondary coating and the glass, thus minimizing microbending and the resulting signal attenuation. In order to attain this property, the shape of the modulus versus temperature curve (i.e., the modulus of the primary coating at low temperatures) is of vital importance.

The primary coating should also have a relatively high refractive index, i.e., greater than that of the cladding material of the fiber to be coated. This high refractive index allows for a refractive index differential between the glass cladding and the primary coating. This differential allows errant light signals to be refracted away from the glass core.

Another requisite quality of the primary (buffer) coating is resistance to moisture. Moisture will rapidly degrade the strength of the coating itself as well as the underlying glass fibers under stress. The reaction is one of hydrolysis and stress corrosion. Moisture will also adversely affect the adhesion of the primary (buffer) coating to the glass, resulting in possible delamination. It is therefore desirable for the coating to be as hydrophobic as possible. Preferably, the primary coating should have a water absorption value of less than 5% by weight, and more preferably less than 2.5% by weight.

SECONDARY COATING

Similarly, the secondary coating must have a number of essential and optimal qualities. The secondary coating must function as a hard protective layer which allows the fiber not to be damaged during its processing and use. Consequently, this secondary coating should have a relatively high glass transition temperature (Tg), i.e., about 50° C., and a high modulus, i.e., about 100,000 psi. It is desirable for the secondary coating to have a Tg higher than its highest use temperature, because at or near the Tg of a polymer, many physical properties such as modulus, tensile strength, thermal expansion coefficient, moisture absorptivity, and so forth, change dramatically with small changes in temperature. This results in large changes in the fiber characteristics.

Furthermore, like the primary coating, the secondary coating should undergo minimal changes in physical properties on exposure to moisture. Many polymeric coating materials experience significant hydrolysis, plasticization, softening, and loss of protective function in the presence of water. Therefore, it is desirable that the secondary coating should also be as hydrophobic as possible. A hydrophobic secondary coating also enhances the ability of the primary coating to keep water away from the glass fiber itself, and thus inhibits moisture induced hydrolysis and stress corrosion of the glass fiber.

Also, the secondary coating must have a high refractive index, i.e., preferably higher than that of the cladding material of the glass fiber, to enable it to strip out errant light, as with the primary coating, especially in embodiments where the primary coating is omitted.

Another important property of secondary coatings is the coefficient of friction (COF). A low COF facilitates winding and unwinding of the fibers on spools; it also allows the fibers to slide easily along each other in a cable structure, thus relieving stress. However, if the COF is too low, the fibers will have a reduced tendency to stay aligned on the spool. The COF is largely determined by the cure properties of the secondary coating; if the coating has a good hard surface cure, its COF will tend to be low. Various slip additives can be added to lower the COF; however, deleterious effects such as surface tension problems, contamination, volatilization and blooming may result from their use.

DESIRABLE FEATURES FOR BOTH COATINGS

Still other desirable properties exist which apply to both the primary and secondary coatings. For example, fiber manufacturers are motivated to coat the fibers as rapidly as possible to attain the economy of faster cure speeds, as these result in higher line speeds. The cure speeds of coating materials may be determined by constructing a UV dose versus modulus curve. The lowest UV dose at which the coating modulus exhibits dose independence is considered its cure speed. There is therefore a demand for faster curing coatings; for example, high line speeds are obtained with primary and secondary coatings which may be applied wet-on-wet and simultaneously ultraviolet light-cured. One way of doing this is described in U.S. Pat. No. 4,474,830, issued Oct. 2, 1984 to Carl R. Taylor, which patent is expressly incorporated herein by reference.

According to this patent, an optical fiber is passed through a coating applicator comprising first and second dies. The first die confines a first coating liquid over a portion of the fiber's length. A second coating liquid is applied onto the fiber through a clearance between the first and second dies. The clearance is sufficiently small so that substantially no recirculation of the second coating liquid occurs in the vicinity of the point of application to the fiber. The second coating liquid is preferably applied at a free surface; that is, not in contact with either the first or second dies in the immediate vicinity of the point of application to the fiber. Additional coatings can be applied in a similar manner.

Another desirable objective for both primary and secondary UV-curable coatings is to minimize the amount of unbound material in the coating after cure. Even when the cured coatings are considered 100% solids, there may still exist a small amount of material which does not chemically bind into the polymer network on curing. Examples of such materials used in the coatings include unreacted monomer, unreacted photoinitiator, certain non-functional additives and so forth. The presence of excessive amounts of such materials is undesirable, inasmuch as volatilization of such components over time may change the physical properties of the coating. For example, volatile materials from the primary coating may permeate into the secondary coating, tending to plasticize it and resulting in strength loss. Also, volatile materials may cause production of unpleasant odors.

Still other important qualities of both optical fiber coatings are viscosity and shelf life. Good shelf life is considered formulation stability of at least six to twelve months. Viscosity can typically be somewhat adjusted by regulation of the temperature at which the coatings are applied. However, it is advantageous to set the viscosity high enough so as to maintain proper rheology and handling of the coating on application, but low enough to facilitate bubble release and to minimize the amount of heat needed in the preparation. Excessive heating is undesirable inasmuch as it may result in premature gelling or viscosity buildup due to possible thermal initiation of polymerization.

PRIOR ART COATINGS

Various single or double layer fiber coatings exist in the prior art. Among these are epoxy- or urethane-based resins. However, many of these resins cure slowly; or have poor hydrophobicity; poor hydrolytic, thermal and oxidative stability; and undesirable yellowing properties.

There have also been developed primary (buffer) coatings which cure on exposure to ultraviolet radiation. Such prior art primary coatings, however, have conventionally not been very moisture resistant and have some of the same deficiencies as above.

To obviate these flaws, the primary-coated optical fibers of the prior art have been topcoated with a tough and flexible overcoat which possesses superior resistance to moisture and abrasion. Prior art coatings have included extruded nylon "jacket" coatings, which are, however, more expensive and more difficult to apply than would be an ultraviolet-cured coating.

Therefore, the present invention seeks to provide primary and secondary coatings having maximal thermal, oxidative and hydrolytic stability, wherein the primary coating is adequately adherent to the glass fiber yet strippable therefrom; provides adequate cushioning of the fiber; has a relatively low glass transition temperature; and is capable of relieving stress upon the fiber. The secondary coating must function as a hard protective layer; have a relatively high glass transition temperature and high modulus; be hydrophobic to resist moisture; have a high refractive index; and have an appropriate coefficient of friction value. In addition, the two coatings can be formulated for wet-on-wet application, with simultaneous radiation curing at commercially acceptable cure speeds.

SUMMARY OF THE INVENTION

Accordingly, in preferred embodiments of the invention, radiation-curable primary and secondary coatings for optical fibers have been provided. The primary coatings have refractive indices greater than those of their fiber substrates, and relatively low glass transition temperatures and moduli (i.e., less than about $-20°$ C. and less than about 500 psi, respectively). The secondary coatings have relatively high glass transition temperatures (i.e., about 50° C.) and moduli of about 100,000 psi. The secondary coatings also have refractive indices greater than those of the cladding material of the optical fiber, for stripping out errant light in a monocoat application. An optical fiber coated with the secondary coating alone, or with the primary and secondary coatings of the present invention, has also been developed.

The radiation-curable primary coating for an optical fiber of the present invention comprises, in one preferred embodiment:

(A) from about 20 percent to about 80 percent by weight of an acrylated urethane oligomer which is the reaction product of (i) a hydrocarbon polyol; (ii) an aliphatic polyisocyanate; and (iii) an endcapping monomer selected from hydroxyalkylacrylate and hydroxyalkylmethacrylate;

(B) from about 5 percent to about 50 percent by weight of an alkyl acrylate or methacrylate monomer having between 6 and 18 carbon atoms in the alkyl moiety;

(C) from about 5 percent to about 60 percent by weight of a monomer or oligomer having (1) an aromatic moiety, (2) a moiety containing acrylic or methacrylic unsaturation, and (3) a hydrocarbon moiety, which monomer or oligomer is capable of increasing the refractive index of the composition;

(D) from about 0.1 percent to about 3.0 percent by weight of an organofunctional silane adhesion promoter; and (E) from about 1.0 percent to about 10 percent by weight of a photoinitiator, all of the above stated percentages by weight for the primary coating being based on the total weight of (A), (B), (C), (D) and (E).

The primary coating may optimally contain other materials, such as at least one chain transfer agent, preferably a mercapto-functional chain transfer agent, and at least one stabilizer.

The invention also comprises a radiation-curable secondary coating for an optical fiber comprising, in one preferred embodiment:

(I) from about 20 percent to about 80 percent by weight of an aliphatic urethane acrylate oligomer based on a polyester;

(II) from about 20 percent to about 60 percent by weight of an acrylated or methacrylated compound selected from the group consisting of isobornyl acrylate; isobornyl methacrylate; $C_6$ to $C_{16}$ saturated hydrocarbon diol diacrylates; $C_6$ to $C_{16}$ saturated hydrocarbon diol dimethacrylates; and mixtures thereof;

(III) from about 1 percent to about 10 percent by weight of a photoinitiator, all of the stated percentages by weight for the secondary coating being based upon the total weight of (I), (II) and (III).

The secondary coating may optimally contain at least one stabilizer.

A coated optical fiber has also been developed. In one embodiment, the optical fiber comprises an optical fiber coated only with a secondary coating layer as described above. In another preferred embodiment, a coated optical fiber comprising an optical fiber, the applied primary coating layer as described above, and the applied secondary coating layer as described above, has been developed.

A process for preparing a coated optical fiber has also been developed. In one embodiment, the process comprises applying to an optical fiber a primary coating layer as described above; applying atop the disclosed primary coating layer a secondary coating layer as described hereinabove; and preferably radiation-curing the two coating layers simultaneously.

The coating compositions of the invention are also useful for other coating and protective purposes. They can be formulated to be useful on glass, ceramic, granite, and marble surfaces, and the like.

DESCRIPTION OF THE PREFERRED EMBODIMENTS

The invention relates in part to radiation-curable primary and secondary coatings for optical fibers. The optical fibers which are coated may comprise a glass core and a glass cladding layer. The core, for example, may comprise silica doped with oxides of germanium or phosphorus and the cladding, a pure or doped silicate such as fluorosilicate. Alternately, the fibers may comprise a polymer-clad silica glass core. Examples of such polymer claddings include organosiloxanes such as polydimethylsiloxane or a fluorinated acrylic polymer. The primary coating should have, inter alia, the following properties: moisture resistance; ease of coating and stripping; low volatiles content; low modulus over the life of the fiber; low glass transition temperature; and long shelf life. The secondary coating should form a hard protective layer; have a relatively high modulus and glass transition temperature; and also be moisture resistant. Both coatings should be transparent; nonmalodorous; fast curing; and remain adherent, even upon aging in high heat and humidity environments.

THE PRIMARY (BUFFER) COATING

The primary coating composition of the present invention contains five ingredients, (A) through (E).

A. The Hydrocarbon-Based Oligomer

The first ingredient is a specific hydrocarbon-based oligomer (A). This component comprises from about 20 percent to about 80 percent by weight of the composition based on the total weight of all the A through E ingredients of the composition. Preferably, this oligomer comprises from about 30 percent to about 70 percent, and more preferably about 45 percent to about 65 percent by weight of the composition, based on total weight of the A through E ingredients.

The particular hydrocarbon-based oligomer used in the present invention was chosen to impart good thermal, oxidative and hydrolytic stability to the system.

It is known in the art that various types of UV-curable oligomers exist which may yield a soft, compliant, low glass transition temperature-type coating. One system known in the art is acrylate-endcapped polybutadiene-type rubber or rubber-modified acrylated monomers as base resins. While these systems have excellent low temperature properties and are suitably hydrophobic, their internal carbon-carbon double bonds (unsaturation) make them susceptible to oxidation over a long period of time.

It is also known in the art to employ acrylated silicones as base resins in such compositions. While these have good low temperature properties and hydrophobicity, they are difficult to formulate with a suitably high refractive index, tend to have poor thermal stability, and may be susceptible to hydrogen outgassing which can lead to signal attenuation in fibers so coated.

Yet another system known in the art involves the use of acrylated fluorocarbons. While these are suitably hydrophobic and thermally stable, they are typically incompatible with most non-halogenated organic compounds. Additionally, they are very expensive relative to other systems.

To overcome many of the disadvantages of the prior art systems, the present invention utilizes a urethane acrylate system based wholly or partially on a hydrogenated polybutadiene backbone. In general, urethane acrylate systems based on polyethers or polyesters have been known, and could be formulated to form soft, low modulus, low Tg buffer coatings. However, systems based on polyethers or polyesters were usually characterized by poor water resistance and by thermal instability. Additionally, known urethane oligomers based on aromatic isocyanates displayed thermal instability and tended to yellow. While polyether-based urethane acrylates have excellent low Tg properties, they are generally not hydrophobic enough for optical fiber applications and are susceptible to oxidation. Polyester-based urethane acrylates, on the other hand, have good thermal stability but are susceptible to hydrolysis.

Thus, the present invention uses an oligomer which obviates many of the above problems.

The oligomer (A) utilized in the present invention is the reaction product of (i) a hydrocarbon polyol; (ii) an aliphatic polyisocyanate; and (iii) an endcapping monomer.

The hydrocarbon polyol (i) is provided by a linear or branched hydrocarbon containing a plurality of hydroxyl end groups, and providing a hydrocarbon backbone to the oligomer. The hydrocarbon portion is from about 600 to about 4,000 molecular weight. Molecular weight in this case is determined by gel permeation chromatography (GPC), using a methylene chloride solvent, as measured against polystyrene molecular weight standards. By "hydrocarbon" is meant a non-aromatic compound containing a majority of methylene groups (—$CH_2$—) and which may contain internal unsaturation and/or pendent unsaturation. Fully saturated (i.e., hydrogenated) hydrocarbons are preferred because the long term stability of the cured optical fiber coating increases as the degree of unsaturation decreases. Suitable hydrocarbon polyols include hydroxyl-terminated, fully or partially hydrogenated 1,2-polybutadiene; 1,2-polybutadiene polyol hydrogenated to an iodine number of from 9 to 21; fully or partially hydrogenated polyisobutylene polyol; mixtures thereof, and the like. Preferably, the hydrocarbon polyol is substantially fully hydrogenated, and thus a preferred polyol is hydrogenated 1,2-polybutadiene.

The polyisocyanate component (ii) is non-aromatic. Oligomers based on aromatic polyisocyanates effect yellowing in the cured coating. Non-aromatic polyisocyanates of from 4 to 20 carbon atoms may be employed. Suitable saturated aliphatic polyisocyanates include isophorone diisocyanate; dicyclohexylmethane-4,4'-diisocyanate; 1,4-tetramethylene diisocyanate; 1,5-pentamethylene diisocyanate; 1,6-hexamethylene diisocyanate; 1,7-heptamethylene diisocyanate; 1,8-octamethylene diisocyanate; 1,9-nonamethylene diisocyanate; 1,10-decamethylene diisocyanate; 2,2,4-trimethyl-1,5-pentamethylene diisocyanate; 2,2'-dimethyl-1,5-pentamethylene diisocyanate; 3-methoxy-1,6-hexamethylene diisocyanate; 3-butoxy-1,6-hexamethylene diisocyanate; omega,omega'-dipropylether diisocyanate; 1,4-cyclohexyl diisocyanate; 1,3-cyclohexyl diisocyanate; trimethylhexamethylene diisocyanate; and mixtures thereof. Isophorone diisocyanate is the preferred aliphatic polyisocyanate.

The reaction rate between the hydroxyl-terminated hydrocarbon and the diisocyanate may be increased by use of a catalyst in the amount of 100 to 200 ppm. Suitable catalysts include dibutyl tin dilaurate, dibutyl tin oxide, dibutyl tin di-2-hexoate, stannous oleate, stannous octoate, lead octoate, ferrous acetoacetate, and amines such as triethylamine, diethylmethylamine, triethylenediamine, dimethyl-ethylamine, morpholine, N-ethyl morpholine, piperazine, N,N-dimethyl benzylamine, N,N-dimethyl laurylamine, and mixtures thereof. A preferred catalyst is dibutyl tin dilaurate.

The endcapping monomer (iii) is a hydroxyl-terminated aliphatic acrylate or methacrylate conforming to the formula

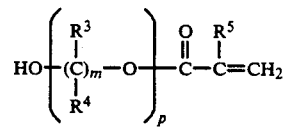

wherein $R^3$, $R^4$ and $R^5$ are independently selected from the group consisting of hydrogen, methyl, ethyl or propyl, m is an integer from 1 to 10, and p is 0 or 1. Suitable hydroxyl-terminated monoacrylates which may be used as the endcapping monomer include hydroxyethyl acrylate, hydroxyethyl methacrylate, hydroxypropyl acrylate and hydroxypropyl methacrylate. Hydroxyethyl acrylate is preferred because it imparts a faster cure ratio to the polyurethane oligomer. The molar ratio of the polyol, diisocyanate and endcapping monomer is preferably approximately 1:2:2.

A preferred oligomer is based on the formula

where $R^1$ is a linear or branched hydrocarbon polymer of from 600 to 4,000 molecular weight selected from the group consisting of fully or partially hydrogenated 1,2-polybutadiene; 1,2-polybutadiene hydrogenated to an iodine number of from 9 to 21; and fully or partially hydrogenated polyisobutylene;

$R^2$ is a linear, branched or cyclic alkylene of from six to twenty carbon atoms; and X and Q are independently either (a) a radical of the formula:

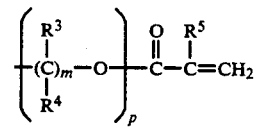

wherein $R^3$, $R^4$, and $R^5$ are independently hydrogen, methyl, ethyl or propyl, m is an integer from 1 to 10, and p is either zero or one, or (b) a saturated alkyl radical of from nine to twenty carbon atoms, with the proviso that the above oligomer must possess at least one acrylate or methacrylate terminal (end) group.

The above-described oligomer is disclosed in U.S. Pat. No. 4,786,586 to Lee et al., which patent is herein incorporated by reference.

The above-described oligomer is particularly suitable because its saturated hydrocarbon backbone gives the oligomer suitable hydrophobicity and thermal stability. The glass transition temperature of the oligomer is approximately −20° C. and may be lowered by blending with additives, discussed infra.

The primary coating containing this oligomer has a water absorption value of less than 5% by weight, and preferably less than 2.5%.

B. The Acrylate-Functional Monomer

The second essential component of the composition of the primary coating composition is an alkyl acrylate or methacrylate-based monomer (B). The alkyl portion (moiety) of the monomer has between 6 and 18 carbon atoms, and preferably between 8 and 15, and therefore is hydrocarbon in character. This monomer (B) may be either straight chain or branched. This component comprises from about 5 percent to about 50 percent by weight of the composition, based upon the total weight of the A through E ingredients of the composition. Preferably, it comprises from about 7.5 percent to about 30 percent, and more preferably from about 10 percent to about 20 percent by weight of the composition, based upon the total weight of the five components (A), (B), (C), (D) and (E).

The monomer is selected to be one that is compatible with the very hydrophobic oligomer discussed above. It is also chosen to be one which is soft-curing and which has a low Tg, thus lowering the Tg of the composition including it. Suitable examples of $C_6$ to $C_{18}$ alkyl acrylate or methacrylate-based monomers include hexyl acrylate; hexyl methacrylate; 2-ethylhexyl acrylate; 2-ethylhexyl methacrylate; isooctyl acrylate; isooctyl methacrylate; octyl acrylate; octyl methacrylate; decyl acrylate; decyl methacrylate; isodecyl acrylate; isodecyl methacrylate; lauryl acrylate; lauryl methacrylate; stearyl acrylate; stearyl methacrylate; $C_{14}$–$C_{15}$ hydrocarbon diol diacrylates; $C_{14}$–$C_{15}$ hydrocarbon diol dimethacrylates; and mixtures of the above. Preferred alkyl acrylate monomers include stearyl acrylate, lauryl acrylate and isodecyl acrylate. A particularly preferred one is lauryl acrylate. The alkyl acrylate or methacrylate-based monomer should be used in a quantity sufficient to adjust the total primary coating composition to a viscosity in the range of about 2,000 cps (centipoises) to 10,000 cps, measured by a Brookfield viscometer, model LVT, spindle speed of 6 rpm, spindle number 34, at 25° C.

C. The Monomer or Oligomer Containing An Aromatic Moiety

The next ingredient is a monomer or oligomer (C) which is capable of adjusting the refractive index of the composition. The monomer or oligomer (C) contains at least (1) an aromatic moiety, (2) a moiety containing acrylic or methacrylic unsaturation, and (3) a hydrocarbon moiety. This compound should be used in an amount effective for its stated purpose not in excess of about 60 percent by weight, and generally should comprise from about 5 percent to about 60 percent by weight, preferably from about 10 percent to about 40 percent by weight and more preferably, from about 15 percent to about 30 percent by weight of the composition, based upon total weight of the ingredients (A) through (E).

The monomer or oligomer (C) may be used to increase the refractive index for the reasons specified above. The aromatic moiety of the monomer or oligomer is itself capable of raising the refractive index; however, the hydrocarbon moiety is required to increase the compatibility of this monomer with the hydrocarbon-based oligomer (A). The moiety containing acrylic or methacrylic unsaturation renders the compound compatible with the system as a whole, inasmuch as it has available reactive acrylic unsaturation which allows it to crosslink with the rest of the composition upon ultraviolet curing, thus minimizing volatiles content of the cured system. Samples of aromatic monomers or oligomers additionally containing hydrocarbon character and a vinyl group include polyalkylene glycol nonylphenylether acrylates such as polyethylene glycol nonylphenylether acrylate or polypropylene glycol nonylphenylether acrylate; polyalkylene glycol nonylphenylether methacrylates such as polyethylene glycol nonylphenylether methacrylate or polypropylene glycol nonylphenylether methacrylate; and mixtures of these. In each case the phenyl group serves to increase the refractive index of the coating and the nonyl component renders the composition somewhat more hydrophobic and, therefore, compatible with the hydrophobic oligomer (A). The refractive index of the composition including this monomer or oligomer is at least about 0.005 higher than that of the composition comprising only (A), (B), (D) and (E). A suitable primary coating composition may, for example, have a refractive index of greater than or equal to 1.48.

The refractive index of the primary coating must be higher than that of the cladding of the fiber. If the fibers coated with the coating composition of the present invention are down-doped, i.e., contain dopants which lower the refractive index of the fiber itself, the refractive index of the coating will be different enough from that of the fiber so that errant signals will be refracted away even without the incorporation of this component. Therefore, in such embodiments, the monomer or oligomer (C) is not essential to the composition.

D. The Adhesion Promoter

The fourth ingredient is an adhesion promoter (D). Adhesion becomes a particularly pertinent problem in high humidity and high temperature environments, where delamination is more of a risk.

It is known in the art to use either acid-functional materials or organofunctional silanes to promote adhesion of resins to glass. While acid-functional materials are operative herein, organo-functional silanes are preferred. Acid-functional materials are less preferred, however, because of their possible corrosivity towards the materials, and their tendency to lose their adhesion properties on exposure to moisture. Silanes tend to be much more suitable in terms of these factors and, therefore, are the adhesion promoters of choice. Additionally, it is useful to have an adhesion promoter having a functionality which binds in with the system during cure, again to minimize the quantities of unbound volatiles. Various suitable organofunctional silanes include but are not limited to amino-functional silanes; mercapto-functional silanes; methacrylate-functional silanes; acrylamido-functional silanes; allyl-functional silanes; vinyl-functional silanes; and acrylate-functional silanes. The adhesion promoters preferably are methoxy-or ethoxy-substituted as well. Preferred organofunctional silanes include but are not, limited to mercaptoalkyl trialkoxy silane, methacryloxyalkyl trialkoxy silane, aminoalkyl trialkoxy silane, mixtures thereof, and the like. Methacrylated silanes are desirable, inasmuch as they bind in well with the cured system, but tend to slow the cure speed of the system down by an order of magnitude. The mercapto-functional adhesion promoters also chemically bind in during cure, but do not appreciably slow down the cure speed of the system.

Some preferred organofunctional silanes that enhance adhesion in humid conditions include 3-aminopropyl triethoxy silane, 3-methacryloxypropyltrimethoxy silane, 3-mercaptopropyl trimethoxy silane and 3-mercaptopropyl (gamma-mercaptopropyl) triethoxy silane, and mixtures thereof. A particularly preferred adhesion promoter is 3-mercaptopropyl trimethoxy silane.

The silane component should be incorporated into the composition in a small but effective amount to enhance the adhesion of the composition to the surface of an inorganic substrate, in this embodiment, glass, and in other embodiments, glass, enamel, marble, granite or the like. The silane component comprises from about 0.1 percent to about 3.0 percent by weight of the composition, based on total weight of the five A through E ingredients. Preferably, the silane comprises from about 0.2 percent to about 2.0 percent, and more preferably from about 0.3 percent to about 1.0 percent, based on the total weight of the oligomer, alkyl acrylate or methacrylate, multifunctional monomer, photoinitiator and silane.

E. The Photoinitiator

A fifth ingredient of the primary coating composition is a photoinitiator (E). The photoinitiator, when used in a small but effective amount to promote radiation cure, must provide reasonable cure speed without causing premature gelation of the composition. Further, it must not interfere with the optical clarity of the cured optical coating. Still further, the photoinitiator must itself be thermally stable, and non-yellowing and efficient.

Suitable photoinitiators include the following: hydroxycyclohexylphenyl ketone; hydroxymethylphenylpropanone; dimethoxyphenylacetophenone; 2-methyl-1-[4-(methyl thio)phenyl]-2-morpholino-propanone-1; 1-(4-isopropylphenyl)-2-hydroxy-2-methylpropan-1-one; 1-(4-dodecylphenyl)-2-hydroxy-2-methylpropan-1-one; 4-(2-hydroxyethoxy)phenyl-(2-hydroxy-2-propyl)ketone; diethoxyacetophenone; 2,2-di-sec-butoxyacetophenone; diethoxy-phenyl acetophenone; and mixtures of these.

The photoinitiator preferably comprises from about 1.0 percent to about 10.0 percent by weight of the composition, based upon the total composition of the A through E ingredients. Preferably, the amount of photoinitiator is from about 1.5 percent to about 8.0 percent, and more preferably about 2.0 percent to about 7.0 percent by weight, based upon total weight of A through E ingredients. A particularly preferred photoinitiator is hydroxycyclohexylphenyl ketone. The photoinitiator should be chosen such that a cure speed, as measured in a dose versus modulus curve, of less than 1.0 $J/cm^2$, and preferably less than 0.5 $J/cm^2$, is required, when the photoinitiator is used in the designated amount.

OPTIONAL COMPONENTS

Various optional components may be used in the primary coating beyond the five A through E components. For example, optional chain transfer agents may be used to control the modulus and glass transition temperature of the coating. The curing of acrylate-containing monomers or oligomers is a free radical process. One way known in the art to control the molecular weight and, consequently, the modulus and glass transition temperature of a free radical polymerization product is to use one or more chain transfer agents. It is postulated that the addition of a chain transfer agent to a formulation lowers the molecular weight of a polymer produced and results in a lower modulus, lower glass transition temperature coating.

Preferred chain transfer agents are mercapto compounds, optionally having a hydrocarbon chain of at least eight carbon atoms. Examples of suitable mercapto chain transfer agents include methyl thioglycolate; methyl-3-mercaptopropionate; ethyl thioglycolate; butyl thioglycolate; butyl-3-mercaptopropionate; isooctyl thioglycolate; isooctyl-3-mercaptopropionate; isodecyl thioglycolate; isodecyl-3-mercaptopropionate; dodecyl thioglycolate; dodecyl-3-mercaptopropionate; octadecyl thioglycolate; and octadecyl-3-mercaptopropionate. Parathiocresol; thioglycolic acid; and 3-mercaptopropionic acid may also be used, but may display some incompatibility with the resin and may produce odor problems.

A particularly preferred chain transfer agent is octadecyl-3-mercaptopropionate (ODMP).

The chain transfer agent may, if used, comprise from about 0.1 percent to about 10.0 percent by weight of the composition based upon the total weight of the A through E ingredients. Preferably, the chain transfer agent comprises from about 0.25 percent to about 5.0 percent by weight, and still more preferably from about 0.5 percent about 4.0 percent by weight, based on the total weight of the five A through E components. A suitable chain transfer agent, when incorporated at about a 1.0 percent by weight level, lowers the glass transition temperature of the composition by about 3° C., lowers the modulus by about 100 psi, and apparently increases the adhesion of the coating to the glass fiber. When greater than about 2.0 percent by weight of the chain transfer agent is incorporated in the composition, the modulus and glass transition temperature of the composition are desirably lowered, but the shelf life is reduced somewhat.

To improve shelf life (storage stability) of the uncured coating, as well as to increase thermal and oxidative stability of the cured coating, one or more stabilizers may be included in the composition. Examples of suitable stabilizers include tertiary amines such as diethylethanolamine and trihexylamine; hindered amines; organic phosphites; hindered phenols; mixtures thereof; and the like. Some particular examples of antioxidants which can be used include octadecyl-3-(3',5'-di-tert-butyl-4'-hydroxyphenyl) propionate; thiodiethylene bis (3,5-di-tert-butyl-4-hydroxy) hydrocinnamate; and tetrakis [methylene (3,5-di-tert-butyl-4-hydroxyhydrocinnamate)] methane.

When a stabilizer is used, it may be incorporated in an amount from about 0.1 percent to about 3.0 percent, based on the weight of the A through E ingredients. Preferably, it is included in the range from about 0.25 percent to about 2.0 percent by weight, and more preferably in the range from about 0.5 percent to about 1.5 percent by weight, based on the total weight of the A through E ingredients. Desirable properties of a stabilizer include (1) non-migration (probably enhanced by low polarity) and (2) basicity (to allow it to help in neutralizing residual acid which might prematurely initiate polymerization). Preferred stabilizers are octadecyl-3-(3',5'-di-tert-butyl-4'-hydroxyphenyl) propionate and trihexylamine.

A preferred primary composition for coating an optical fiber, then, comprises the following:

(A) from about 45 percent to about 65 percent by weight of an aliphatic urethane acrylate oligomer having as a backbone a hydrogenated 1,2-polybutadiene polymer;

(B) from about 10 percent to about 20 percent by weight of lauryl acrylate;

(C) from about 15 percent to about 30 percent by weight of polypropylene glycol nonylphenyl ether acrylate;

(D) from about 0.3 percent to about 1.0 percent by weight of gamma mercaptopropyl trimethoxy silane adhesion promoter;

(E) from about 2.0 percent to about 7.0 percent by weight of hydroxycyclohexylphenyl ketone photoinitiator;

(F) from about 0.5 percent to about 4.0 percent by weight of octadecyl-3-mercaptopropionate, a chain transfer agent; and (G) from about 0.5 percent to about 1.5 percent by weight of octadecyl 3-(3',5'-di-tert-butyl-4'-hydroxyphenyl) propionate; wherein all of the stated percentages are percentages by weight, based upon total weight of (A) through (E), inclusive.

THE SECONDARY COATING

The most important properties of the secondary optical fiber coating are again good thermal, oxidative and hydrolytic stability; hardness; high modulus; high glass transition temperature; and high refractive index. The secondary coating of the present invention was thus formulated to possess these and other qualities. Again, the secondary coating of the present invention comprises (I) from about 20 percent to about 80 percent by weight of an aliphatic urethane acrylate oligomer based on a polyester;

(II) from about 20 percent to about 60 percent by weight of an acrylated or methacrylated compound selected from the group consisting of hexanediol diacrylate; hexanediol dimethacrylate; isobornyl acrylate; isobornyl methacrylate; $C_6$ to $C_{16}$ saturated hydrocarbon diol diacrylates; $C_6$ to $C_{16}$ saturated hydrocarbon diol dimethacrylates; and mixtures thereof; and (III) from about 1.0 percent to about 10 percent by weight of a photoinitiator, all of the stated percentages by weight being based upon the total weight of (I), (II) and (III).

I. The Aliphatic Urethane Acrylate Oligomer

The first essential component (I) of the secondary coating composition is an aliphatic urethane acrylate oligomer based on a polyester.

Commonly used oligomers in UV-curing systems include acrylated polyesters, epoxies and urethanes. Acrylated polyesters are undesirable inasmuch as they are susceptible to hydrolysis on high temperature hydrolytic aging. Acrylated epoxies have unacceptable thermal and oxidative stability problems and are prone to yellowing. With respect to the acrylated urethanes, both aromatic and aliphatic isocyanate-based urethanes are available. The aromatic urethanes have poor thermal and oxidative stability, but the aliphatic urethanes do not possess these deficiencies.

The backbone of most commercially available urethane acrylates is of a polyether or polyester nature. Both of these backbones have inherent disadvantages. The polyethers are generally hydrolytically stable, but are susceptible to oxidation. The polyesters, on the other hand, are oxidatively stable but susceptible to hydrolysis. Polyesters can be protected from hydrolysis by maximizing the formulation hydrophobicity via the selection of hydrophobic monomers, initiators, additives, and so forth, and/or by selection of inherently hydrophobic polyesters. Formulation hydrophobicity can be improved in the same manner when polyether-based urethanes are used. However, with polyether-based urethanes, it is also necessary to add various thermal stabilizers and antioxidants. Thus, the preferred approach is to use hydrophobic polyester-based urethanes that are protected from hydrolysis via selection of other formulation constituents so as to maximize overall formulation hydrophobicity. This is important because the overall physical properties of the coating are dramatically reduced if it absorbs water.

A suitable base oligomer, then, is an aliphatic urethane oligomer having a polyester backbone. An example of a particularly desirable one is an acrylated aliphatic urethane oligomer, containing 75 percent oligomer solids in a hexanediol diacrylate solvent. A suitable oligomer is Cargill 1512, available from Cargill Inc., Minneapolis, Minn., which comprises 75 percent by weight of an acrylic aliphatic urethane oligomer based on a polyester in 25 percent by weight hexanediol diacrylate. The oligomer component comprises from about 20 percent to about 80 percent by weight, more preferably 30 percent to about 80 percent by weight, and still more preferably from about 40 percent to about 80 percent by weight of the total weight of the essential composition, dry solids basis, the above percentages being based on the weight of oligomer only.

II. The Acrylate-Functional Compound Component

The second component in the secondary coating is an acrylated or methacrylated compound (II). The function of this compound is to adjust the viscosity of the coating to one which renders it easy to apply to the buffer-coated fibers. The compound is one which is hydrocarbon in nature so as to render it hydrophobic and to make it compatible with the rest of the system, and preferably which contains a bicyclic structure so that it is low shrinking.

Suitable monomers include isobornyl acrylate; isobornyl methacrylate; $C_6$ to $C_{16}$ saturated hydrocarbon diol acrylates or methacrylates such as a mixture of $C_{14}$ and $C_{15}$ diol diacrylates or dimethacrylates, or hexanediol diacrylate or hexanediol dimethacrylate, or mixtures of these. A mixture of isobornyl acrylate and hexanediol diacrylate (the hexanediol diacrylate being provided as the reactive solvent for the oligomer) is a preferred constituent. The acrylated or methacrylated component (II) comprises from about 20 percent to about 60 percent by weight of the composition, more preferably from about 25 to about 50 percent, and still more preferably from about 30 to about 40 percent by weight, based on total weight of the (I), (II) and (III) components, dry solids basis.

III. The Photoinitiator

As with the primary coating, a photoinitiator (III) is a desirable component of the secondary coating. Any of the acceptable photoinitiators disclosed as suitable for the primary coating are again suitable; again, the preferred photoinitiator is hydroxycyclohexylphenyl ketone. The photoinitiator is used in an amount that is effective to initiate radiation curing of the composition, and may comprise from about 1.0 percent to about 10 percent by weight, based on the total weight of (I), (II) and (III), preferably from about 1.5 to about 8 percent by weight, and more preferably from about 2.0 percent to about 7.0 percent by weight of the photoinitiator, based on the weight of the (I), (II) and (III) components, is used.

Generally, a lower level of photoinitiator is acceptable and desirable in the secondary coating relative to the primary coating. First of all, the secondary coating has a higher acrylate functionality relative to the primary, and is inherently faster curing than the primary. Also, in order to maximize the amount of light available to cure the primary coating through the secondary coating, it is important not to use too much photoinitiator in the secondary coating, as in the case where the coatings are applied wet-on-wet and then simultaneously cured.

As with the primary coating, various stabilizers may be incorporated, including but not limited to one or more of organic phosphites, hindered phenols, hindered amines, mixtures thereof, and the like. A particularly preferred stabilizer is thiodiethylene bis (3,5-di-tert-butyl-4-hydroxy) hydrocinnamate. When used, the stabilizer may be present in amounts of from about 0.1 percent to about 3 percent by weight, more preferably from about 0.25 percent to about 2 percent by weight, and still more preferably from about 0.5 to about 1.5 percent by weight, based on the weight on the total weight of the (I) oligomer, (II) monomer and (III) photoinitiator.

A preferred secondary coating composition for coating an optical fiber, then, comprises the following:

(I) from about 40 percent to about 80 percent by weight of an aliphatic urethane acrylate oligomer based on a polyester;

(II) from about 30 percent to about 40 percent by weight of a mixture of isobornyl acrylate and hexanediol diacrylate; and (III) from about 2.0 percent to about 7.0 percent by weight of hydroxycyclohexylphenyl ketone photoinitiator, wherein all of the stated percentages are by weight based upon total weight of (I), (II) and (III).

More preferably, this composition also includes from about 0.5 percent to about 1.5 percent by weight, based on the weight of the composition, of a stabilizer such as thiodiethylene bis (3,5-di-tert-butyl-4-hydroxy) hydrocinnamate.

The modulus of the secondary coating should be at least about 40,000 psi. The relatively high modulus of the secondary coating relative to the primary results in desirable properties, such as cut-through resistance and microbending resistance, and in the formation of slick fibers, allowing for easy spooling and unspooling.

In a preferred embodiment, the secondary coating of the invention may be used overtop a primary coating. However, in another embodiment, optical fibers may be coated directly with the secondary coating, omitting a primary coating layer. Such conditions where only a secondary coating may suffice include those in which the fiber will not be exposed to extremes in temperature; to high humidity; or to an excessive amount of bending. Such uses might include long haul applications such as transoceanic or transcontinental cables wherein the fibers are enclosed in cabling material.

PREPARATION OF A COATED OPTICAL FIBER

The invention also relates to a process for preparing a coated optical fiber. The process comprises (i) applying to an optical glass fiber a primary coating layer comprising (A) from about 20 percent to about 80 percent by weight, based upon total weight of (A), (B), (C), (D) and (E), of an acrylated urethane oligomer which is the reaction product of (i) a hydrocarbon polyol; (ii) an aliphatic polyisocyanate; and (iii) an endcapping monomer selected from the group consisting of hydroxyalkylacrylate and hydroxyalkylmethacrylate;

(B) from about 5 percent to about 50 percent by weight, based upon total weight of (A), (B), (C), (D) and (E), of an alkyl acrylate or methacrylate monomer having 6 to 18 carbon atoms in the alkyl moiety;

(C) from about 5 percent to about 60 percent by weight, based upon total weight of (A), (B), (C), (D) and (E), of a monomer or oligomer having (1) an aromatic moiety, (2) a moiety having acrylic or methacrylic unsaturation, and (3) a hydrocarbon moiety which monomer or oligomer is capable of increasing the refractive index of the composition relative to that of a composition containing only (A), (B), (D) and (E);

(D) from about 0.1 percent to about 3.0 percent by weight, based upon total weight of (A), (B), (C), (D) and (E), of an organofunctional silane adhesion promoter; and (E) from about 1.0 percent to about 10 percent by weight, based upon total weight of (A), (B), (C), (D) and (E), of a photoinitiator;

(ii) applying atop said primary coating layer a secondary coating layer comprising (I) from about 20 percent to about 80 percent by weight, based upon the total weight of (I), (II) and (III), of an aliphatic urethane acrylate oligomer based on a polyester;

(II) from about 2 percent to about 60 percent by weight, based upon the total weight of (I), (II) and (III), of an acrylated or methacrylated compound selected from the group consisting of isobornyl acrylate; isobornyl methacrylate; $C_6$ to $C_{16}$ saturated hydrocarbon diol diacrylates; $C_6$ to $C_{16}$ saturated hydrocarbon diol dimethacrylates; and mixtures thereof; and (III) from about 1 percent to about 10 percent by weight, based upon the total weight of (I), (II) and (III), of a photoinitiator; and, preferably, (iii) radiation-curing in situ said primary and secondary coating layers.

In an alternate embodiment, the process comprises applying only the secondary coating of the invention to the optical fiber and radiation-curing the secondary coating in situ.

The primary and/or secondary coatings may be applied and cured by any method known in the art. A preferred method, whereby two coatings are applied wet-on-wet, is disclosed in U.S. Pat. No. 4,474,830 to C. Taylor of AT&T Bell Laboratories. The coating or coatings may then be cured in situ, preferably by ultraviolet irradiation, to obtain a cured polymeric coating. Alternatively, the primary coating may be applied and cured, after which the secondary coating may be applied and cured.

COATED OPTICAL FIBERS OF THE INVENTION

The invention further relates to optical fibers, and especially to glass optical fibers, that are coated with the secondary coating of the invention alone, or coated with both the primary and secondary coatings. The primary coating surrounding the fiber forms a cured polymeric material having a glass transition temperature, Tg, of no more than $-20°$ C., and preferably lower, i.e., about $-30.C$, or even lower.

The Tg of the cured primary coating should be lower than the lowest use temperature, but high enough so that its modulus increases as the temperature is lowered. This characteristic offsets the difference in the coefficients of thermal expansion between the secondary coating and the optical fiber, and thus minimizes microbending and resultant signal attenuation.

The cured secondary coating should have a relatively high Tg, generally approximately $50°$ C., and a high modulus, i.e., about 100,000 psi. It is desirable for the secondary coating to have a Tg higher than its highest use temperature. This is because at or near the Tg of the polymer, the physical properties change dramatically with small changes in temperature.

When cured, the two coatings of the invention confer extraordinary thermal, hydrolytic and oxidative stability to the fiber and relieve stress thereon. Optical fibers having applied thereto both the primary and secondary coatings of the invention are highly moisture resistant and otherwise protected from environmental damage.

The coating compositions of the present invention have been disclosed hereinabove for use as optical fiber coatings. However, it is to be understood that these coatings may be used in any embodiment wherein stable, moisture resistant coatings are desired, especially for coating the surface of an optically useful article. For example, the coatings may be used for such diverse end uses as coating sheet glass (i.e., in the preparation of safety glass) to coating vinyl materials (e.g., in preparing no-wax floors). Other optically useful articles which may be prepared include, but are not limited to, photoswitches, photorelay devices, microelectronic devices, photocoupling devices, and so forth.

EXAMPLES

The following Examples serve to further illustrate the invention. In these examples and elsewhere throughout this application, all parts and percentages are by weight, on a dry solids basis, and all temperatures are in degrees centigrade unless expressly stated to be otherwise. In all of the examples, cure speeds were measured with an International Light IL 745-A radiometer with model A309 light bug. Unlike in the remainder of the application, where percentages by weight referred to the total weight of either the A through E ingredients for the primary coating, or the I through III ingredients for the secondary coating, respectively, parts by weight in the Examples refers to the total composition described in that Example, including all components. The optional ingredients are identified by an asterisk (*) in the Examples. The other components are essential for use, if the exemplified coating is to meet the rigorous requirements for a commercially acceptable coating for optical glass fiber.

EXAMPLE I

Primary Coating for Optical Fibers

An ultraviolet-curable, primary coating composition was made up as follows:

| Ingredient | Parts by Weight |
|---|---|
| aliphatic urethane acrylate oligomer with saturated hydrocarbon backbone (A) | 55.00 |
| polypropylene glycol nonylphenylether acrylate (C) | 19.50 |
| lauryl acrylate (B) | 14.50 |
| hydroxycyclohexylphenyl ketone photoinitiator (E) | 6.00 |
| octadecyl-3-mercaptopropionate chain transfer agent* | 2.75 |
| octadecyl-3-(3', 5'-di-tert-butyl-4'-hydroxyphenyl) propionate stabilizer* | 1.50 |
| gamma-mercaptopropyl trimethoxy silane adhesion promoter (D) | 0.75 |

The viscosity of the uncured coating was 4005 cps (at $25°$ C. using a Brookfield viscometer, model LVT, 6 rpm, #34 spindle).

A six mil coating of this composition was applied to a flat glass sheet using a Bird applicator and cured in air at 0.7 $J/cm^2$ using a 200 watts per inch medium pressure mercury vapor lamp.

The cured primary coating which resulted had a glass transition temperature of about $-39.6°$ C., and a cured film refractive index of 1.492. The effect of temperature on modulus was as follows: $25°$ C.: 153.0 psi; $0°$ C.: 167.8 psi; $-20°$ C.: 864.7 psi; $-40°$ C.: 49,807 psi; $-60°$ C.: 199,018 psi. The cure speed, as determined by a modulus versus dose curve, was determined to be about 0.3 $J/cm^2$.

Water absorption of the sample was measured as follows. The cured film was equilibrated at 50% ($\pm5\%$) relative humidity and $23°$ C. ($\pm2°$ C.) for 48 hours. The sample was weighed and a weight "A" recorded. The sample was then soaked for 24 hours at $25°$ C. in distilled water, then patted dry and weighed. This weight was recorded as "B". The sample was next placed in a vacuum oven under 10 mm Hg pressure at $25°$ C. for 24 hours, removed, and again equilibrated at 50% ($\pm5\%$) relative humidity at $23°$ C. ($\pm2°$ C.) for 48 hours and weighed. This third weight was recorded as "C". Percent water absorption measured as $$\frac{B - C}{A} \times 100\%$$

was about 1.48%.

Other samples of this 6 mil thick coating were tested as follows to determine the effect of accelerated aging on various properties. The samples were equilibrated at 50% ($\pm5\%$) relative humidity and $23°$ C. ($\pm2°$ C.) for 48 hours and then placed on clips and hung in an environmental chamber under the following accelerated aging conditions:
(1) $125°$ C. for 7 days;
(2) $93.3°$ C. for 10 days;
(3) $93.3°$ C. for 30 days;
(4) $93.3°$ C., 95% relative humidity, for 10 days;
(5) $93.3°$ C., 95% relative humidity, for 30 days.
After the designated time period, the samples were removed and again equilibrated for 48 hours. The following properties were recorded. These data indicate excellent stability against thermal and hydrolytic stress.

|  | 125° C., 7 days | 93.3° C., 10 days | 93.3° C., 30 days | 93.3° C., 95% relative humidity, 10 days | 93.3° C., 95% relative humidity, 30 days |
|---|---|---|---|---|---|
| weight change | −7.68% | −6.71% | −6.98% | −0.71% | −1.62% |
| Tg midpoint | −34.6° C. | −34.6° C. | −36.6° C. | −35.5° C. | −36.6° C. |
| Instron modulus change (at 25° C.) | +33.1% | +39.4% | +37.9% | +27.9% | +19.5% |

EXAMPLE II

Another Primary Coating for Optical Fiber

An ultraviolet radiation-curable primary coating was made up as follows:

| Ingredient | Parts by Weight |
|---|---|
| aliphatic urethane acrylate oligomer with saturated hydrocarbon backbone (A) | 56.00 |
| polyethylene glycol nonylphenyl ether acrylate (C) | 25.00 |
| isodecyl acrylate (B) | 11.75 |
| hydroxymethylphenyl-propanone photoinitiator (E) | 6.00 |
| thiodiethylene bis (3,5-di-tert-butyl-4-hydroxy) hydrocinnamate stabilizer* | 0.50 |
| gamma mercaptopropyl trimethoxy silane adhesion promoter (D) | 0.75 |

The above formulation used several different ingredients, and somewhat different proportions, than were used in Example I. This formulation had a viscosity of 5650 cps at 25° C. using a Brookfield viscometer, model LVT, 6 rpm, #34 spindle, and a refractive index of 1.4849 at 21.8° C. When coated onto a glass plate in the same manner as in Example I and cured in air at 0.7 J/cm² under a medium pressure 200 watts per inch mercury vapor lamp, the resultant 6 mil thickness coating had a modulus of 295.8 psi, a Tg of −28.7° C., good adhesion to glass and low water absorption (2.02%). The coating performed well in high humidity and dry accelerated aging tests.

EXAMPLE III

A Further Primary Coating for Optical Fiber

The following primary coating was formulated:

| Ingredient | Parts by Weight |
|---|---|
| aliphatic urethane acrylate oligomer with saturated hydrocarbon backbone (A) | 56.00 |
| polyethylene glycol nonylphenylether acrylate (lower MW polyethylene glycol than that of Example II) (C) | 25.00 |
| octyl/decyl acrylate (B) | 11.75 |
| hydroxymethylphenyl-propanone photoinitiator (E) | 6.00 |

| Ingredient | Parts by Weight |
|---|---|
| thiodiethylene bis (3', 5'-di-tert-butyl-4-hydroxy) hydrocinnamate stabilizer* | 0.50 |
| gamma-mercaptopropyl trimethoxy silane adhesion promoter (D) | 0.75 |

This formulation demonstrated the use of alternate (B) and (C) materials. This formulation had a viscosity of 3890 cps at 25° C. using a Brookfield viscometer, model LVT, spindle #34, 6 rpm. When applied to a glass plate as in Example I and cured in air at 0.7 J/cm² under 200 watt per inch medium pressure mercury vapor lamp, it had a modulus of 276.0 psi, good adhesion to glass, and low water absorption (1.89%).

EXAMPLE IV

Another Primary Coating for Optical Fibers

The following primary coating was formulated:

| Ingredient | Parts by Weight |
|---|---|
| aliphatic urethane acrylate oligomer with saturated hydrocarbon backbone (A) | 64.00 |
| polyethylene glycol nonylphenylether acrylate (same MW as in Example III) (C) | 8.00 |
| isodecyl acrylate (B) | 20.50 |
| hydroxymethylphenyl-propanone photoinitiator (E) | 6.00 |
| thiodiethylene bis (3', 5'-di-tert-butyl-4'-hydroxy) hydrocinnamate stabilizer* | 0.50 |
| gamma-mercaptopropyl trimethoxy silane adhesion promote (D) | 0.35 |
| isooctyl-3-mercaptopropionate chain transfer agent* | 0.65 |

This formulation demonstrated the use of different proportions of ingredients, the use of an alternate chain transfer agent, and the use of a low concentration of the component (C) to adjust the refractive index. The formulation had a viscosity of 5950 cps at 25° C. using a Brookfield viscometer, model LVT, 6 rpm, #34 spindle, and a refractive index of 1.4796 at 21.5° C. When applied to a glass sheet as a 6 mil coating as in Example I and cured in air at 0.7 J/cm² under a medium pressure 200 watts per inch mercury vapor lamp, it had a modulus of 280 psi, a Tg of −31.2° C., good adhesion to glass, and low water absorption (1.41%).

EXAMPLE V

A Slower Curing Primary Coating for Optical Fibers

A radiation curable primary coating was formulated as follows:

| Ingredient | Parts by Weight |
| --- | --- |
| aliphatic urethane acrylate oligomer with saturated hydrocarbon backbone (A) | 54.00 |
| polypropylene glycol nonylphenylether acrylate (C) | 19.50 |
| lauryl acrylate (B) | 14.00 |
| hydroxycyclohexylphenyl ketone (E) | 6.00 |
| octadecyl-3-mercaptopropionate chain transfer agent* | 4.00 |
| octadecyl-3(3',5'-di-tert-butyl-4'-hydroxy phenyl) propionate stabilizer* | 1.50 |
| gamma-methacryloxypropyl trimethoxysilane adhesion promoter (D) | 1.00 |

The viscosity of the uncured coating was 3750 cps (at 25° C. using a Brookfield viscometer, model LVT, 6 rpm, #34 spindle).

When coated on a glass sheet at 6 mils and cured as in previous examples, the coating adhered well under high humidity conditions but cured much slower than the coating of Example I. Similar formulations can be prepared that have much more rapid rates of cure, by substituting acrylated silanes for the methacrylated silane used in this Example.

The cured primary coating which resulted had a glass transition temperature of about −39.4° C., a modulus of 155.5 psi, and a cured film refractive index of 1.492. The cure speed was determined to be 0.5 $J/cm^2$, and the water absorption was 1.40%, both being determined according to the methods of Example I.

Weight change, glass transition temperature and Instron modulus change were measured under the same conditions as in Example I and recorded to be as follows. Again, excellent hydrolytic and thermal stability was observed.

|  | 125° C., 7 days | 93.3° C., 10 days | 93.3° C., 30 days | 93.3° C., 95% relative humidity, 10 days | 93.3° C., 95% relative humidity, 30 days |
| --- | --- | --- | --- | --- | --- |
| weight change | −7.94% | −6.84% | −7.19% | −1.97% | −1.58% |
| Tg midpoint | −35.9° C. | −36.1° C. | −35.5° C. | −35.7° C. | −36.4° C. |
| Instron modulus change (at 25.C) | +33.8% | +36.1% | +36.0% | +20.1% | +10.9% |

EXAMPLE VI

A Secondary Coating for Optical Fibers

A radiation-curable, secondary coating composition was made up as follows:

| Ingredient | Parts by Weight |
| --- | --- |
| aliphatic urethane acrylate oligomer with polyester backbone, in 25% (based on weight of oligomer and solvent only) hexanediol diacrylate solvent* (solvent only is optional) (I) | 82.00 |
| Isobornyl acrylate (II) | 13.00 |
| hydroxycyclohexylphenyl ketone photoinitiator (III) | 4.00 |
| thiodiethylene bis (3,5-di-tert-butyl-4'-hydroxy) hydrocinnamate stabilizer* | 1.00 |

A six mil coating of the above composition was applied to a glass plate using a Bird applicator. The coating was cured in air at 0.7 $J/cm^2$ using a medium pressure 200 watts per inch mercury vapor lamp. The resulting film of the secondary coating exhibited a modulus of about 103,700 psi, a water absorption of about 1.68%, and a cured film refractive index of about 1.506. The cure speed, as determined by a modulus versus dose curve, was determined to be about 0.3 $J/cm^2$. The UV transmission of the uncured coating was determined to be about 73% by calculating the ratio of the light transmission of a 1 mm quartz slide containing a 1 mil coating of the uncured composition to that of the slide without the coating on it.

Weight change and Instron modulus change (here measured at 85° C.) were measured under the same conditions as in Example I and recorded to be as follows. Again, excellent hydrolytic and thermal stability was observed.

|  | 125° C., 7 days | 93.3° C., 10 days | 93.3° C., 30 days | 93.3° C., 95% relative humidity, 10 days | 93.3° C., 95% relative humidity, 30 days |
| --- | --- | --- | --- | --- | --- |
| weight change | −4.60% | −3.91% | −4.30% | −0.85% | −1.10% |
| Instron modulus change at (85° C.) | +17.2% | +18.3% | +34.3% | −4.3% | −23.9% |

EXAMPLE VII

Another Secondary Coating for Optical Fibers

A secondary coating identical to that of Example VI, except for containing 14.00% isobornyl acrylate and no optional stabilizer, was formulated. The coating, when applied to glass and cured as above, had good tensile properties, cure speed, water absorption, UV transmission and stability, but yellowed on dry age testing.

EXAMPLE VIII

A Coating Having a High Tg and High Crosslink Density

A coating composition was formulated as follows:

| Ingredient | Parts by Weight |
|---|---|
| aliphatic urethane acrylate oligomer with polyester backbone (I) (used as a mixture containing 12% hexanediol acrylate) | 60.00 |
| dipentaerythritol monohydroxy pentaacrylate | 15.00 |
| a mixture of linear $C_{14}$ and $C_{15}$ diol diacrylates | 10.00 |
| isobornyl acrylate (II) | 11.00 |
| hydroxycyclohexylphenyl ketone photoinitiator (III) | 4.00 |

The aliphatic urethane acrylate oligomer (I) is believed to have imparted good properties. Formulations such as the above perform well on thermal, oxidative, and hydrolytic aging tests, with almost no yellowing characteristics. The oligomer (I), as available commercially, cures to a lower modulus than the oligomer used in Example VI in solution.

The mixture of $C_{14}$ and $C_{15}$ diol diacrylates was used as a viscosity adjuster in conjunction with the isobornyl acrylate.

The above formulation was applied to glass as a 6 mil coating using the coating technique of Example I, and UV-cured. It had a high Tg and high crosslink density as compared to the coating of Example VI.

A similar formulation was prepared, but incorporating about 0.5 parts by weight of a 50:50 mixtures of bis (2,4-di-t-butylphenyl) pentaerythritol phosphite and thiodiethylene bis (3,5-di-t-butyl-4-hydroxy) hydrocinnamate, as a stabilizer package. On evaluation, hydrolytic stability deteriorated, probably because of the use of the phosphite. This is undesirable for optical fiber coatings, but is not a problem for many other coating applications. When the hindered phenol is used above as the stabilizer at the 1% level, hydrolytic stability is again acceptable for optical fiber coating use.

EXAMPLE IX

A Further Coating Formulation

The following coating composition was prepared:

| Ingredient | Parts by Weight |
|---|---|
| aliphatic urethane acrylate oligomer with polyester backbone (I) | 59.50 |
| dipentaerythritol monohydroxy pentaacrylate | 14.50 |
| isobornyl acrylate (II) | 11.00 |
| a mixture of linear $C_{14}$ and $C_{15}$ diol diacrylates | 10.00 |
| hydroxycyclohexylphenyl ketone photoinitiator (III) | 4.00 |
| thiodiethylene bis (3,5-di-tert-butyl-4-hydroxy) hydrocinnamate stabilizer* | 1.00 |

This coating composition exhibited a slightly slower curing rate than the formulation of Example VI, apparently, based on cure speed versus modulus data. These data may have given a false impression because of the high Tg and high crosslink density of this coating. However, the hydrolytic aging properties of this coating, while good, were not quite as good as those of the Example VI coating. Its viscosity and room temperature moduli were similar to those of the Example VI formulation. Its properties overall are such that it is an acceptable secondary coating for glass optical fibers.

CONCLUSION

Optical glass fibers coated with the primary and secondary coatings of the present invention have been designed to possess several important qualities rendering the coated fibers useful for many applications and particularly suitable in local area networks for fiber-to-the-home uses.

The primary coatings, when cured, possess a refractive index greater than that of the underlying fiber (i.e., about 1.48), a modulus of less than about 500 psi and a glass transition temperature of less than about $-20°$ C., and preferably less than about $-30°$ C. The primary coatings are sufficiently hydrophobic to resist moisture penetration and consequent hydrolysis of the underlying optical fibers; have a sufficiently low modulus to cushion and protect the fibers; and a sufficiently low glass transition temperature so as to remain rubbery and thus act as a cushion to the glass fibers throughout the possible use temperature range of the fibers.

The secondary coatings after cure function as a hard, protective layer having a glass transition temperature of about $50°$ C., and a modulus of about 100,000 psi. Furthermore, the secondary coatings are resistant to moisture and have an appropriate coefficient of friction for their desired use. The secondary coatings have a coefficient of friction allowing the coated fibers to slide easily along each other while staying aligned on a spool.

Both the primary and secondary coatings have suitable viscosities for coating and, when cured, contain minimal quantities of unbound reactants (volatiles) and have good shelf life characteristics.

The present invention permits the production of coating formulations meeting these criteria, and the manufacture of coated optical fibers well suited for use in fiber-to-the-home applications.

There are many uses for coatings that are prepared in accordance with the invention, that do not have to meet the stringent requirements imposed on optical fiber coatings. Thus, useful coatings for many purposes may be formulated, comprising:

(A) from about 20 percent to about 80 percent by weight of an acrylated urethane oligomer which is the reaction product of (i) a hydrocarbon polyol; (ii) an aliphatic polyisocyanate; and (iii) an endcapping monomer selected from the group consisting of hydroxyalkylacrylate and hydroxyalkylmethacrylate;

(B) a low Tg, soft curing, hydrocarbon monofunctional acrylate monomer;

(C) a chain transfer agent comprising a hydrocarbon chain having at least eight carbons in its hydrocarbon chain; and (D) a stabilizer or antioxidant that imparts added shelf life and storage stability to the coating composition, the combination of (B), (C), and (D) with (A) having the effect of producing a coating of mutually compatible ingredients, that is radiation-curable. Preferably, the (B) component comprises from about 5 percent to about 50 percent by weight (based on the total weight of (A)

and (B)) of an alkyl acrylate or methacrylate monomer having between 6 and 18 carbon atoms in the alkyl moiety, and the glass transition temperature of the coating containing it is −20° C. or less. The composition may be, in one embodiment, used as a primary coating for an optical fiber, the coating having an uncured liquid viscosity at 25° C. of about 4,000 to 10,500 cps and a cured tensile modulus of less than 500 psi (at room temperature, based on a 6 mil thick film).

In other embodiments, compositions of this kind can be formulated to be useful as interlayers for laminated safety glass, and as coatings for electronic devices such as photocells and photoswitches, for example.

In still other embodiments, the composition additionally may comprise any or all of (C) from about 5 percent to about 60 percent by weight of a monomer or oligomer having (1) an aromatic moiety, (2) a moiety containing acrylic or methacrylic unsaturation, and (3) a hydrocarbon moiety, which monomer or oligomer is capable of increasing the refractive index of the composition relative to that of a composition containing only (A) and (B); and/or (D) an amount of an organofunctional silane adhesion promoter that is effective to promote adhesion to the surface of a vitreous substrate; and/or (E) an amount of a photoinitiator that is effective to promote radiation-curing of said coating, the composition incorporating (C) and/or (D) and/or (E) preferably still having glass transition temperature, uncured liquid viscosity, and cured tensile modulus and storage stability in the same ranges as in the composition absent these components.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A radiation-curable primary coating for an optical fiber comprising
   (A) from about 20 percent to about 80 percent by weight of an acrylated urethane oligomer which is the reaction product of (i) a hydrocarbon polyol, the hydrocarbon portion of which is from about 600 to 4,000 molecular weight; (ii) an aliphatic polyisocyanate; and (iii) an encapping monomer selected from the group consisting of hydroxyalkylacrylate and hydroxyalkylmethacrylate;
   (B) from about 5 percent to about 50 percent by weight of an alkyl acrylate or methacrylate monomer having between 6 and 18 carbon atoms in the alkyl moiety;
   (C) from about 5 percent to about 60 percent by weight of a monomer or oligomer having (1) an aromatic moiety, (2) moiety containing acrylic or methacrylic unsaturation, and (3) a hydrocarbon moiety, which monomer or oligomer is capable of increasing the refractive index of the composition relative to that of a composition containing only (A), (B), (D) and (E);
   (D) from about 0.1 percent to about 3.0 percent by weight of an organofunctional silane adhesion promoter; and
   (E) from about 1.0 percent to about 10 percent by weight of a photoinitiator, wherein all of the stated percentages are percentages by weight based on total weight of (A), (B), (C), (D) and (E).

2. A radiation-curable primary coating for an optical fiber according to claim 1 wherein said hydrocarbon polyol (i) is selected from the group consisting of fully or partially hydrogenated 1,2-polybutadiene polyol; 1,2-polybutadiene polyol hydrogenated to an iodine number of from 9 to 21; fully or partially hydrogenated polyisobutylene polyol; and mixtures thereof.

3. A radiation-curable primary coating for an optical fiber according to claim 1 wherein said aliphatic polyisocyanate (ii) is selected from the group consisting of isophorone diisocyanate; dicyclohexylmethane-4,4′-diisocyanate; hexamethylene diisocyanate; and trimethylhexamethylene diisocyanate.

4. A radiation-curable primary coating for an optical fiber according to claim 1 wherein said oligomer (A) is endcapped with hydroxyethyl acrylate.

5. A radiation-curable primary coating for an optical fiber according to claim 1 wherein said oligomer (A) is characterized by the formula $$XOCNHR^2NHCOR^1OCNHR^2NHCOQ$$
$$\phantom{X}\|\phantom{OCNHR^2NHCO}\|\phantom{R^1OCNHR^2NHCO}\|\phantom{OCNHR^2NHCO}\|$$
$$\phantom{X}O\phantom{OCNHR^2NHCOR^1}O\phantom{OCNHR^2NHCO}O\phantom{OCNHR^2NHCO}O$$

where
$R^1$ is a linear or branched hydrocarbon polymer of from 600 to 4,000 molecular weight selected from the group consisting of fully or partially hydrogenated 1,2-polybutadiene; 1,2-polybutadiene hydrogenated to an iodine number of from 9 to 21; and fully or partially hydrogenated polyisobutylene;
$R^2$ is a linear, branched or cyclic alkylene of from six to twenty carbon atoms; and
X and Q are independently either
(a) a radical of the formula:

$$\left\{ \begin{array}{c} R^3 \\ | \\ (C)_m \\ | \\ R^4 \end{array} - O \right\}_p - \overset{O}{\underset{\|}{C}} - \overset{R^5}{\underset{|}{C}} = CH_2$$

wherein $R^3$, $R^4$, and $R^5$ are independently hydrogen, methyl, ethyl or propyl, m is an integer from 1 to 10, and p is either zero or one, or
(b) a saturated alkyl radical of from nine to twenty carbon atoms,
with the proviso that said oligomer must possess at least one acrylate or methacrylate terminal group.

6. A radiation-curable primary coating according to claim 1 wherein said monomer (B) is selected from the group consisting of hexyl acrylate; hexyl methacrylate; 2-ethylhexyl acrylate; 2-ethylhexyl methacrylate; isooctyl acrylate; isooctyl methacrylate; octyl acrylate; octyl methacrylate; decyl acrylate; decyl methacrylate; isodecyl acrylate; isodecyl methacrylate; lauryl acrylate; lauryl methacrylate; stearyl acrylate; stearyl methacrylate; $C_{14}$–$C_{15}$ hydrocarbon diol diacrylates; $C_{14}$–$C_{15}$ hydrocarbon diol dimethacrylates; and mixtures thereof.

7. A radiation-curable primary coating according to claim 1 wherein said monomer (B) is selected from the group consisting of lauryl acrylate; stearyl acrylate; isodecyl acrylate; and mixtures thereof.

8. A radiation-curable coating according to claim 1 wherein said monomer or oligomer (C) is selected from the group consisting of polyalkylene glycol nonylphenyl ether acrylates; polyalkylene glycol nonylphenyl ether methacrylates; and mixtures thereof.

9. A radiation-curable coating according to claim 1 wherein said monomer or oligomer (C) is selected from the group consisting of polyethylene glycol nonylphenyl ether acrylate; polypropylene glycol nonylphenyl ether acrylate; and mixtures thereof.

10. A radiation-curable primary coating according to claim 1 wherein said silane adhesion promoter (D) is selected from the group consisting of amino-functional silanes; mercapto-functional silanes, methacrylate functional silanes; acrylamido-functional silanes; allyl-functional silanes; vinyl-functional silanes; acrylate-functional silanes; and mixtures thereof.

11. A radiation-curable primary coating according to claim 1 wherein said silane adhesion promoter (D) is selected from the group consisting of mercaptoalkyl trialkoxy silane; methacryloxyalkyl trialkoxy silane; aminoalkyl trialkoxy silane; and mixtures thereof.

12. A radiation-curable primary coating according to claim 1 wherein said silane adhesion promoter (D) is gamma-mercaptopropyl trimethoxy silane.

13. A radiation-curable primary coating for optical fibers according to claim 1 wherein said photoinitiator (E) is selected from the group consisting of hydroxycyclohexylphenyl ketone; hydroxymethylphenyl propanone; dimethoxyphenyl acetophenone; 2-methyl-1-2-morpholino-propanone-1; 1-(4-isoproyplphenyl)-2-hydroxy-2-methylpropan-1-one; 1-(4-dodecylphenyl)-2-hydroxy-2-methylpropan-1-one; 4-(2-hydroxyethoxy)-phenyl-2(2-hydroxy-2-propyl)ketone; diethoxyacetophenone; 2,2-di-sec-butoxyacetophenone; diethyoxyphenyl acetophenone; and mixtures thereof.

14. A radiation-curable primary coating for an optical fiber according to claim 1 wherein said photoinitiator (E) is hydroxycyclohexylphenyl ketone.

15. A radiation-curable primary coating for an optical fiber according to claim 1 additionally comprising from about 0.1 percent to about 10 percent by weight, based on total weight of (A), (B), (C), (D) and (E), of a mercapto functional chain transfer agent (F).

16. A radiation-curable primary coating for an optical fiber according to claim 15 wherein said chain transfer agent (F) is selected from the group consisting of methyl thioglycolate; methyl-3-mercaptopropionate; ethyl thioglycolate; butyl thioglycolate; butyl-3-mercaptopropionate; isooctyl thioglycolate; isooctyl-3-mercaptopropionate; isodecyl thioglycolate; isodecyl-3-mercaptopropionate; dodecyl thioglycolate; dodecyl-3-mercaptopropionate; octadecyl thioglycolate; octadecyl-3-mercaptopropionate; and mixtures thereof.

17. A radiation-curable primary coating for an optical fiber according to claim 15 wherein said chain transfer agent is octadecyl-3-mercaptopropionate.

18. A radiation-curable primary coating for an optical fiber according to claim 1 additionally comprising from about 0.1 percent to about 3.0 percent by weight, based on total weight of (A), (B), (C), (D) and (E), of a stabilizer (G) selected from the group consisting of organic phosphites; hindered phenols; amines; and mixtures thereof.

19. A radiation-curable primary coating according to claim 18 wherein said stabilizer is trihexylamine.

20. A radiation-curable primary coating for an optical fiber according to claim 1 additionally comprising a stabilizer (G) which is octadecyl-3-(3',5'-di-tert-butyl-4'-hydroxy phenyl)propionate.

21. A radiation-curable coating according to claim 1, wherein said silane adhesion promoter (D) is methacryloxypropyl trimethoxy silane.

22. A radiation-curable coating according to claim 1, wherein said silane adhesion promoter (D) is an ethoxy-substituted vinyl-functional silane.

23. A radiation-curable primary coating for an optical fiber, comprising
   (A) from about 45 percent to about 65 percent by weight of an aliphatic urethane acrylate oligomer having as a backbone a hydrogenated 1,2-polybutadiene polymer;
   (B) from about 10 percent to about 20 percent by weight of lauryl acrylate;
   (C) from about 15 percent to about 30 percent by weight of polypropylene glycol nonylphenyl ether acrylate;
   (D) from about 0.3 percent to about 1.0 percent by weight of an ethoxy-substituted vinyl-functional silane adhesion promoter; and
   (E) from about 2.0 percent to about 7.0 percent by weight of hydroxycyclohexylphenyl ketone photoinitiator,
   wherein all of the stated percentages are percentages by weight, based upon total weight of (A), (B), (C), (D) and (E).

24. A radiation-curable secondary coating for an optical fiber comprising
   (I) from about 20 percent to about 80 percent by weight of an aliphatic urethane acrylate oligomer based on a polyester;
   (II) from about 20 percent to about 60 percent by weight of an acrylated or methacrylated compound selected from the group consisting of isobornyl acrylate; isobornyl methacrylate; $C_6$ to $C_{16}$ saturated hydrocarbon diol diacrylates; $C_6$ to $C_{16}$ saturated hydrocarbon diol dimethacrylates; and mixtures thereof; and
   (III) from about 1 percent to about 10 percent by weight of a photoinitiator, wherein all of the stated percentages are percentages by weight based on total weight of (I), (II) and (III), and wherein said coating is substantially free of acrylated epoxies.

25. A radiation-curable secondary coating for optical fibers according to claim 24 wherein said compound (II) is a mixture of isobornyl acrylate and hexanediol diacrylate.

26. A radiation-curable secondary coating for an optical fiber according to claim 24 additionally comprising a stabilizer selected from the group consisting of amines, hindered phenols, organic phosphites and mixtures thereof.

27. A radiation-curable secondary coating for an optical fiber according to claim 26 wherein said stabilizer is thiodiethylene bis(3,5-di-tert-butyl-4-hydroxy) hydrocinnamate.

28. A radiation-curable secondary coating for an optical fiber according to claim 24 wherein said photoinitiator is hydroxycyclohexylphenyl ketone.

29. A radiation-curable secondary coating for an optical fiber comprising
   (I) from about 40 percent to about 80 percent by weight of an aliphatic urethane acrylate oligomer based on a polyester;

(II) from about 30 percent to about 40 percent by weight of a mixture of isobornyl acrylate and hexanediol diacrylate; and (III) from about 2.0 percent to about 7.0 percent by weight of hydroxycyclohexylphenyl ketone photoinitiator, wherein all of the stated percentages are by weight based upon total weight of (I), (II) and (III).

30. A coated optical fiber comprising an optical fiber, a primary coating layer and a secondary coating layer, wherein said primary coating layer comprises (A) from about 20 percent to about 80 percent by weight, based upon total weight of (A), (B), (C), (D) and (E), of an acrylated urethane oligomer which is the reaction product of (i) a hydrocarbon polyol, the hydrocarbon portion of which is from about 600 to 4,000 molecular weight; (ii) an aliphatic polyisocyanate; and (iii) an endcapping monomer selected from the group consisting of hydroxyalkylacrylate and hydroxyalkylmethacrylate;

(B) from about 5 percent to about 50 percent by weight, of an alkyl acrylate or methacrylate monomer having between 6 and 18 carbon atoms in the alkyl moiety;

(C) from about 5 percent to about 60 percent by weight of a monomer or oligomer having (1) an aromatic moiety, (2) a moiety containing available acrylic or methacrylic unsaturation, and (3) a hydrocarbon moiety, which monomer or oligomer is capable of increasing the refractive index of the composition relative to that of a composition containing only (A), (B), (D) and (E);

(D) from about 0.1 percent to about 3.0 percent by weight of an organofunctional silane adhesion promoter; and (E) from about 1.0 percent to about 10 percent by weight of a photoinitiator, wherein all of the stated percentages are percentages by weight based on total weight of (A), (B), (C), (D) and (E), and said secondary coating layer comprises (I) from about 20 percent to about 80 percent by weight of an aliphatic urethane acrylate oligomer based on a polyester;

(II) from about 20 percent to about 60 percent by weight of an acrylated or methacrylated compound selected from the group consisting of isobornyl acrylate; isobornyl methacrylate; $C_6$ to $C_{16}$ saturated hydrocarbon diol diacrylates; $C_6$ to $C_{16}$ saturated hydrocarbon diol dimethacrylates; and mixtures thereof; and (III) from about 1 percent to about 10 percent by weight of a photoinitiator, wherein all of the above percentages for said secondary coating are percentages by weight based on the total weight of (I), (II), and (III).

31. A coated optical fiber according to claim 30, wherein said primary and secondary coating layers were radiation cured subsequent to application on said fiber.

32. A coated optical fiber comprising an optical fiber having applied thereto a coating layer comprising (I) from about 20 percent to about 80 percent by weight of an aliphatic urethane acrylate oligomer based on a polyester;

(II) from about 20 percent to about 60 percent by weight of an acrylated or methacrylated compound selected from the group consisting of isobornyl acrylate; isobornyl methacrylate; $C_6$ to $C_{16}$ saturated hydrocarbon diol diacrylates; $C_6$ to $C_{16}$ saturated hydrocarbon diol dimethacrylates; and mixtures thereof; and (III) from about 1 percent to about 10 percent by weight of a photoinitiator, wherein all of the above stated percentages are percentages by weight based on the total weight of (I), (II) and (III), and wherein said coating layer is substantially free of acrylated epoxies.

33. A coated optical fiber comprising an optical fiber having applied thereto a coating layer, comprising (I) from about 30 percent to about 80 percent by weight of an aliphatic urethane acrylate oligomer based on a polyester;

(II) from about 25 percent to about 50 percent by weight of a mixture of isobornyl acrylate and hexanediol diacrylate; and (III) from about 1.5 percent to about 8 percent by weight of hydroxycyclohexylphenyl ketone photoinitiator, wherein all of the stated percentages are by weight based upon total weight of (I), (II) and (III), and wherein said coating layer is substantially free of acrylated epoxies.

34. A coated optical fiber comprising a glass optical fiber, and a continuous coating applied to and surrounding said fiber and formed of a cured oligomeric material having a Tg of $-20°$ C. or lower, yet high enough so that its Instron modulus increases as temperature is lowered, wherein said oligomeric material comprises an acrylated urethane oligomer;

an alkyl acrylate or methacrylate monomer having between 6 and 18 carbon atoms in the alkyl moiety; and a mercaptofunctional chain transfer agent.

35. The coated optical fiber of claim 34 wherein said coating comprises a primary coating layer and a secondary coating layer, both formed of cured polymeric material.

36. The coated optical fiber of claim 35 wherein both of said coating layers are formed from unsaturated materials that are radiation-curable and that are both radiation-cured in situ.

37. A process for preparing a coated optical fiber comprising (i) applying to an optical fiber a primary coating layer comprising (A) from about 20 percent to about 80 percent by weight of an acrylated urethane oligomer which is the reaction product of (i) a hydrocarbon polyol, the hydrocarbon portion of which is from about 600 to 4,000 molecular weight; (ii) an aliphatic polyisocyanate; and (iii) an endcapping monomer selected from the group consisting of hydroxyalkylacrylate and hydroxyalkylmethacrylate;

(B) from about 5 percent to about 50 percent by weight of an alkyl acrylate or methacrylate monomer having between 6 and 18 carbon atoms in the alkyl moiety;

(C) from about 5 percent to about 60 percent by weight of a monomer or oligomer having (1) an aromatic moiety, (2) a moiety containing acrylic or methacrylic unsaturation, and (3) a hydrocarbon moiety, which monomer or oligomer is capable of increasing the refractive index of the composition relative to that of a composition containing only (A), (B), (D) and (E);

(D) from about 0.1 percent to about 3.0 percent by weight of an organofunctional silane adhesion promoter; and (E) from about 1.0 percent to about 10 percent by weight of a photoinitiator; and (ii) applying atop said primary coating layer a secondary coating layer comprising (I) from about 20 percent to about 80 percent by weight, based upon total weight of (I), (II) and (III), of an aliphatic urethane acrylate oligomer based on a polyester;

(II) from about 20 percent to about 60 percent by weight, based upon total weight of (I), (II) and (III), of an acrylated or methacrylated compound selected from the group consisting of isobornyl acrylate; isobornyl methacrylate; $C_6$ to $C_{16}$ saturated hydrocarbon diol diacrylates; $C_6$ to $C_{16}$ saturated hydrocarbon diol dimethacrylates; and mixtures thereof; and (III) from about 1 percent to about 10 percent by weight, based upon total weight of (I), (II) and (III), of a photoinitiator.

38. A process according to claim 37 wherein said primary and secondary coating layers are radiation-cured by ultraviolet irradiation.

39. A radiation-curable coating for the surface of an optically useful article comprising (A) from about 20 percent to about 80 percent by weight of an acrylated urethane oligomer which is the reaction product of (i) a hydrocarbon polyol, the hydrocarbon portion of which is from about 600 to 4,000 molecular weight; (ii) an aliphatic polyisocyanate; and (iii) an endcapping monomer selected from the group consisting of hydroxyalkylacrylate and hydroxyalkylmethacrylate;

(B) from about 5 percent to about 50 percent by weight of an alkyl acrylate or methacrylate monomer having between 6 and 18 carbons in the alkyl moiety;

(C) an effective amount not in excess of about 60 percent of a monomer or oligomer containing acrylic or methacrylic unsaturation, that is capable of adjusting the refractive index of the composition relative to that of a composition containing only (A), (B), (D) and (E);

(D) a small but effective amount of an organofunctional silane adhesion promoter; and (E) a small but effective amount of a photoinitiator, wherein all of the stated percentages are percentages by weight based on total weight of (A), (B), (C), (D) and (E).

40. A radiation-curable coating according to claim 39 wherein said hydrocarbon polyol (i) is selected from the group consisting of fully or partially hydrogenated 1,2-polybutadiene polyol; 1,2-polybutadiene polyol hydrogenated to an iodine number of from 9 to 21; fully or partially hydrogenated polyisobutylene polyol; and mixtures thereof.

41. A radiation-curable coating according to claim 39 wherein said aliphatic polyisocyanate (ii) is selected from the group consisting of isophorone diisocyanate; dicyclohexylmethane-4,4'-diisocyanate; hexamethylene diisocyanate; and trimethylhexamethylene diisocyanate.

42. A radiation-curable coating according to claim 39 wherein said oligomer (A) is endcapped with hydroxyethyl acrylate.

43. A radiation-curable coating according to claim 39 wherein said oligomer (A) is characterized by the formula

where $R^1$ is a linear or branched hydrocarbon polymer of from 600 to 4,000 molecular weight selected from the group consisting of fully or partially hydrogenated 1,2-polybutadiene; 1,2-polybutadiene hydrogenated to an iodine number of from 9 to 21; and fully or partially hydrogenated polyisobutylene;

$R^2$ is a linear, branched or cyclic alkylene of from six to twenty carbon atoms; and X and Q are independently either (a) a radical of the formula:

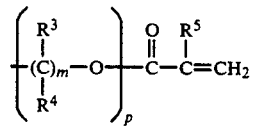

wherein $R^3$, $R^4$, $R^5$ are independently hydrogen methyl, ethyl and propyl, m is an integer from 1 to 10, and p is either zero or one, or (b) a saturated alkyl radical of from nine to twenty carbon atoms, with the proviso that said oligomer must possess at least one acrylate or methacrylate terminal group.

44. A radiation-curable coating according to claim 39 wherein said monomer (B) is selected from the group consisting of hexyl acrylate; hexyl methacrylate; 2-ethylhexyl acrylate; 2-ethylhexyl methacrylate; isooctyl acrylate; isooctyl methacrylate; octyl acrylate; octyl methacrylate; decyl acrylate; decyl methacrylate; isodecyl acrylate; isodecyl methacrylate; lauryl acrylate; lauryl methacrylate; stearyl acrylate; stearyl methacrylate; $C_{14}-C_{15}$ hydrocarbon diol diacrylates; $C_{14}-C_{15}$ hydrocarbon diol dimethacrylates; and mixtures thereof.

45. A radiation-curable coating according to claim 39 wherein said monomer (B) is selected from the group consisting of lauryl acrylate; stearyl acrylate; isodecyl acrylate; and mixtures thereof.

46. A radiation-curable coating according to claim 39 wherein said monomer or oligomer (C) is selected from the group consisting of polyalkylene glycol nonylphenyl ether acrylates; polyalkylene glycol nonylphenyl ether methacrylates; and mixtures thereof.

47. A radiation-curable coating according to claim 39 wherein said monomer or oligomer (C) is selected from the group consisting of polyethylene glycol nonylphenyl ether acrylate; polypropylene glycol nonylphenyl ether acrylate; and mixtures thereof.

48. A radiation-curable coating comprising (A) from about 20 percent to about 80 percent by weight of an acrylated urethane oligomer which is the reaction product of (i) a hydrocarbon polyol, the hydrocarbon portion of which is from about 600 to 4,000 molecular weight; (ii) an aliphatic polyisocyanate; and (iii) an endcapping monomer selected from the group consisting of hydroxyalkylacrylate and hydroxyalkylmethacrylate;

(B) a low Tg, soft curing, hydrocarbon monofunctional acrylate monomer;

(C) from about 5 percent to about 60 percent by weight of a monomer or oligomer which is capable of increasing the refractive index of the composition relative to that of a composition containing only (A), (B), (D) and (E);

(D) from about 0.1 percent to about 3.0 percent by weight of an organofunctional silane adhesion promoter;

(E) from about 1.0 percent to about 10 percent by weight of a photoinitiator;

(F) a chain transfer agent comprising a hydrocarbon chain having at least eight carbons in its hydrocarbon chain; and (G) a stabilizer or antioxidant that imparts added shelf life and storage stability to the coating composition, the combination of (B), (C), and (D) with (A) having the effect of producing a coating of mutually compatible ingredients that is radiation-curable and that has a lower Tg and a lower Instron modulus, at 25° C., than (A) alone, and that has improved storage stability as compared to a composition of (A), (B), and (C) alone.

49. A composition of claim 48 wherein said (B) monomer comprises from about 5 percent to about 50 percent by weight of an alkyl acrylate or methacrylate monomer having between 6 and 18 carbon atoms in the alkyl moiety, wherein the percentages stated above are percentages by weight based on the total weight of (A) and (B).

50. A composition of claim 49 that, when cured, has a lower Tg and a lower Instron modulus than would be the case if the (A) oligomer were cured alone, and that has improved storage stability as compared to a composition of (A), (B), and (F) alone.

51. A composition of claim 50 wherein said cured coating Tg is −20° C. or less.

52. A coating composition of claim 51 that can be used as a primary or buffer coating for an optical fiber and that has an uncured liquid viscosity at 25° C. in the range from about 4,000 cps to about 10,500 cps, as measured on a Brookfield viscometer, model LVT, at 6 rpm, using a number 34 spindle at 25° C.

53. A coating composition of claim 52 wherein said composition, when cast as a film of 6 mil thickness and cured, has a tensile modulus at room temperature of less than 500 psi.

54. A composition of claim 48 wherein said chain transfer agent (F) comprises a mercapto-functional chain transfer agent having a hydrocarbon chain having at least eight carbons in its hydrocarbon chain.

55. A coating composition of claim 48 further comprising an amount of a photoinitiator that is effective to promote radiation-curing of said coating.

56. A radiation-curable coating composition comprising (a) from about 20 percent to about 80 percent by weight of said composition of an acrylated urethane oligomer which is the reaction product of (i) a hydrocarbon polyol, the hydrocarbon portion of which is from about 600 to 4,000 molecular weight; (ii) an aliphatic polyisocyanate; and (iii) an endcapping monomer selected from the group consisting of hydroxyalkylacrylate and hydroxyalkylmethacrylate;

(b) at least one low Tg, soft curing, hydrocarbon monofunctional acrylate monomer;

(c) a chain transfer agent;

(d) a stabilizer or antioxidant that imparts added shelf life and storage stability to the coating composition, and the combination of (b), (c), and (d) with (a) having the effect of producing a coating composition of mutually compatible ingredients that is radiation-curable.

57. A composition of claim 56 wherein said chain transfer agent (c) comprises a mercapto-functional chain transfer agent having a hydrocarbon chain having at least eight carbons in its hydrocarbon chain.

58. A coating composition of claim 57 further comprising (e) from about 5 percent to about 60 percent by weight of a monomer or oligomer having (1) an aromatic moiety, (2) a moiety containing acrylic or methacrylic unsaturation, and (3) a hydrocarbon moiety, which monomer or oligomer is capable of increasing the refractive index of the composition relative to that of a composition containing only (a) and (b).

59. A coating composition of claim 58 further comprising (f) an amount of organofunctional silane adhesion promoter that is effective to promote adhesion of the composition to the surface of an optical fiber.

60. A coating composition of claim 59 further comprising an amount of a photoinitiator that is effective to promote radiation-curing of said coating.

61. A coating composition of claim 60 that has a cured Tg of −20° C. or less.

62. A coating composition of claim 61 having a tensile modulus at room temperature of less than about 500 psi.

63. A coating composition of claim 60 that has an uncured liquid viscosity at 25° C. in the range from about 4,000 cps to about 10,500 cps, as measured at 25° C. using a Brookfield Viscometer, Model LVT, at 6 rpm, using a number 34 spindle.

64. An optical fiber coated with a cured composition according to claim 58.

65. A composition of claim 56 further comprising an amount of an organofunctional silane adhesion promoter effective to enhance the adhesion of said composition to the surface of an inorganic substrate of glass, marble, granite, or like vitreous or inorganic surface, or to the surface of an optical fiber.

66. A coating composition of claim 65 further comprising an amount of a photoinitiator that is effective to promote radiation-curing of said coating.

67. A radiation-curable primary coating for an optical fiber, comprising (A) from about 45 percent to about 65 percent by weight of an aliphatic urethane acrylate oligomer having as a backbone a hydrogenated 1,2-polybutadiene polymer;

(B) from about 10 percent to about 20 percent by weight of lauryl acrylate;

(C) from about 15 percent to about 30 percent by weight of polypropylene glycol nonylphenyl ether acrylate;

(D) from about 0.3 percent to about 1.0 percent by weight of methacryloxypropyl trimethoxy silane adhesion promoter; and (E) from about 2.0 percent to about 7.0 percent by weight of hydroxycyclohexylphenyl ketone photoinitiator, wherein all of the stated percentages are percentages by weight, based upon total weight of (A), (B), (C), (D) and (E).

68. A radiation-curable coating composition comprising (I) from about 20 percent to about 80 percent by weight of an aliphatic urethane acrylate oligomer based on a polyester;

(II) from about 20 percent to about 60 percent by weight of an acrylated or methacrylated compound selected from the group consisting of isobornyl acrylate; isobornyl methacrylate; $C_6$ to $C_{16}$ saturated hydrocarbon diol diacrylates; $C_6$ to $C_{16}$ saturated hydrocarbon diol dimethacrylates; and mixtures thereof; and (III) an amount of a photoinitiator that is effective to initiate radiation curing of said coating, wherein all of the above stated percentages are percentages by weight based on the total weight of (I), (II) and (III), and wherein said coating composition is substantially free of acrylated epoxies.

69. A radiation-curable coating according to claim 68 wherein said compound (II) is a mixture of isobornyl acrylate and hexanediol diacrylate.

70. A radiation curable coating according to claim 68 additionally comprising a stabilizer selected from the group consisting of amines, hindered phenols, organic phosphites and mixtures thereof.

71. A radiation-curable coating according to claim 70 wherein said stabilizer is thiodiethylene bis(3,5-di-tert-butyl-4-hydroxy) hydrocinnamate.

72. A radiation-curable coating according to claim 68 wherein said photoinitiator is hydroxycyclohexylphenyl ketone.

73. An optical fiber coated with a cured composition according to claim 68.

74. A radiation-curable primary coating for an optical fiber, comprising (A) from about 45 percent to about 65 percent by weight of an aliphatic urethane acrylate oligomer having as a backbone a hydrogenated 1,2-polybutadiene polymer;

(B) from about 10 percent to about 20 percent by weight of lauryl acrylate;

(C) from about 15 percent to about 30 percent by weight of polypropylene glycol nonylphenyl ether acrylate;

(D) from about 0.3 percent to about 1.0 percent by weight of gamma mercaptopropyl trimethoxy silane adhesion promoter; and (E) from about 2.0 percent to about 7.0 percent by weight of hydroxycyclohexylphenyl ketone photoinitiator, wherein all of the stated percentages are percentages by weight, based upon total weight of (A), (B), (C), (D) and (E).

75. A radiation-curable primary coating for an optical fiber according to claim 74 additionally comprising from about 0.5 percent to about 4.0 percent by weight, based on total weight of (A), (B), (C), (D) and (E), of octadecyl-3-mercaptopropionate.

76. A radiation-curable primary coating for an optical fiber according to claim 75 additionally comprising from about 0.5 percent to about 1.5 percent by weight, based upon total weight of (A), (B), (C), (D) and (E), of octadecyl 3-(3',5'-di-tert-butyl-4'-hydroxyphenyl) propionate.

77. A coated optical fiber comprising a glass fiber, and a continuous coating surrounding said fiber and formed of a cured oligomeric material having an Instron modulus of at least about 40,000 psi and a glass transition temperature of at least 50° C., wherein said oligomeric material before cure comprised an aliphatic urethane acrylate oligomer based on a polyester;

an acrylated or methacrylated compound; and a photoinitiator, wherein said oligomer material contained substantially no epoxy acrylate oligomer.

78. A coated optical fiber comprising a glass fiber, and at least two coatings applied to and surrounding said fiber, including a primary coating having a Tg of −20° C. or lower yet high enough so that its Instron modulus increases as temperature is lowered, and an Instron modulus of less than about 500 psi such that it forms a soft, rubbery material, and a secondary coating having a Tg of at least 50° C. and an Instron modulus of at least about 40,000 psi such that it forms a hard, tough protective outer layer for the primary coated fiber, said secondary coating containing substantially no epoxy acrylate oligomer.

79. A coated optical fiber according to claim 78, wherein said primary coating is formed of an oligomeric material which before cure comprised an acrylated urethane oligomer;

an alkyl acrylate or methacrylate monomer having between 6 and 18 carbon atoms in the alkyl moiety; and a mercaptofunctional chain transfer agent.

80. A coated optical fiber according to claim 78, wherein said secondary coating is formed of a cured oligomeric material which before cure comprised an aliphatic urethane acrylate oligomer based on a polyester;

an acrylated or methacrylated compound; and a photoinitiator.

81. A coated optical fiber according to claim 80, wherein the Instron modulus after cure of said secondary coating is at least about 100,000 psi.

82. A process for preparing a radiation-curable primary coating for an optical fiber comprising formulating a composition comprising (A) from about 20 percent to about 80 percent by weight of an acrylated urethane oligomer which is the reaction product of (i) a hydrocarbon polyol, the hydrocarbon portion of which is from 600 to 4,000 molecular weight; (ii) an aliphatic polyisocyanate; and (iii) an endcapping monomer selected from the group consisting of hydroxyalkylacrylate and hydroxyalkylmethacrylate;

(B) from about 5 percent to about 50 percent by weight of an alkyl acrylate or methacrylate monomer having between 6 and 18 carbon atoms in the alkyl moiety;

(C) from about 5 percent to about 60 percent by weight of a monomer or oligomer having (1) an aromatic moiety, (2) a moiety containing acrylic or methacrylic unsaturation, and (3) a hydrocarbon moiety, which monomer or oligomer is capable of increasing the refractive index of the composition relative to that of a composition containing only (A), (B), (D) and (E);

(D) from about 0.1 percent to about 3.0 percent by weight of an organofunctional silane adhesion promoter; and (E) from about 1.0 percent to about 10 percent by weight of a photoinitiator, wherein all of the stated percentages are percentages by weight based on total weight of (A), (B), (C), (D) and (E).

83. A process for preparing a radiation-curable primary coating according to claim 82, wherein said oligomer (A) is characterized by the formula $$XOCNHR^2NHCOR^1OCNHR^2NHCOQ$$
$$\quad \| \quad \| \quad \| \quad \|$$
$$\quad O \quad O \quad O \quad O$$

where

R$^1$ is a linear or branched hydrocarbon polymer of from about 600 to 4,000 molecular weight selected from the group consisting of fully or partially hydrogenated 1,2-polybutadiene; 1,2-polybutadiene hydrogenated to an iodine number of from 9 to 21; and fully or partially hydrogenated polyisobutylene;

R$^2$ is a linear, branched or cyclic alkylene of from six to twenty carbon atoms; and X and Q are independently either (a) a radical of the formula

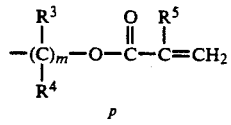

wherein R$^3$, R$^4$, and R$^5$ are independently hydrogen, methyl, ethyl or propyl, m is an integer from 1 to 10, and p is either zero or one, or (b) a saturated alkyl radical of from nine to twenty carbon atoms, with the proviso that said oligomer must possess at least one acrylate or methacrylate terminal group.

84. A process for preparing a radiation-curable primary coating according to claim 82, wherein said composition additionally comprises a mercaptofunctional chain transfer agent (F).

85. A process for preparing a radiation-curable primary coating according to claim 84, wherein said chain transfer agent (F) is selected from the group consisting of methyl thioglycolate; methyl-3-mercaptopropionate; ethyl thioglycolate; butyl thioglycolate; butyl-3-mercaptopropionate; isooctyl thioglycolate; isooctyl-3-mercaptopropionate; isodecyl thioglycolate; isodecyl-3-mercaptopropionate; dodecyl thioglycolate; dodecyl-3-mercaptopropionate; dodecyl thioglycolate; dodecyl-3-mercaptopropionate; octadecyl thioglycolate; octadecyl-3-mercaptopropionate; and mixtures thereof.

86. A process for preparing a radiation-curable primary coating according to claim 82, wherein said composition additionally comprises a stabilizer (G) selected from the group consisting of organic phosphites; hindered phenols; amines; and mixtures thereof.

* * * * *

UNITED STATES PATENT AND TRADEMARK OFFICE
CERTIFICATE OF CORRECTION

PATENT NO. : 5,146,531

DATED : September 8, 1992

INVENTOR(S) : PAUL J. SHUSTACK

It is certified that error appears in the above-identified patent and that said Letters Patent is hereby corrected as shown below:

Column 27, lines 30 and 31 the compound reading "2-methyl-1-2-morpholino-propanone-1" should read -- 2-methyl-1, 4-(methyl thio) phenyl-2 morpholino-propanone-1--.

Column 38, lines 1-6, that portion of the formula reading

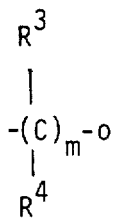   should read   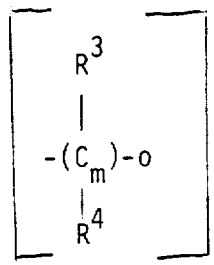

Signed and Sealed this

Twenty-sixth Day of October, 1993

Attest:

*Attesting Officer*

BRUCE LEHMAN

*Commissioner of Patents and Trademarks*